US007979604B2

(12) United States Patent
Kaneda

(10) Patent No.: US 7,979,604 B2
(45) Date of Patent: Jul. 12, 2011

(54) METHODS AND APPARATUS FOR ASSIGNING PERFORMANCE TO DATA VOLUMES ON DATA STORAGE SYSTEMS

(75) Inventor: Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 432 days.

(21) Appl. No.: 11/970,225

(22) Filed: Jan. 7, 2008

(65) Prior Publication Data
US 2009/0177666 A1  Jul. 9, 2009

(51) Int. Cl.
*G06F 3/00* (2006.01)
(52) U.S. Cl. ............... 710/41; 710/36; 710/54; 710/60
(58) Field of Classification Search ............ 707/802, 707/812, 703; 710/41
See application file for complete search history.

(56) References Cited

U.S. PATENT DOCUMENTS

| | | | | |
|---|---|---|---|---|
| 5,706,472 A * | 1/1998 | Ruff et al. | | 711/173 |
| 6,000,023 A * | 12/1999 | Jeon | | 711/173 |
| 6,314,463 B1 * | 11/2001 | Abbott et al. | | 709/224 |
| 6,415,372 B1 * | 7/2002 | Zakai et al. | | 711/165 |
| 7,181,607 B2 | 2/2007 | Ido et al. | | |
| 7,430,572 B2 * | 9/2008 | Kezuka et al. | | 711/114 |
| 7,454,445 B2 * | 11/2008 | Lewis et al. | | 709/203 |
| 2004/0139286 A1 * | 7/2004 | Lin et al. | | 711/151 |
| 2004/0260862 A1 * | 12/2004 | Anderson | | 711/100 |
| 2005/0125593 A1 * | 6/2005 | Karpoff et al. | | 711/4 |
| 2005/0183120 A1 * | 8/2005 | Jain et al. | | 725/46 |
| 2006/0143315 A1 * | 6/2006 | Rudeseal et al. | | 710/5 |
| 2008/0022036 A1 * | 1/2008 | Diehl | | 711/104 |
| 2009/0228535 A1 * | 9/2009 | Rathi et al. | | 707/204 |

* cited by examiner

Primary Examiner — Charles Kim
Assistant Examiner — Sheryl Holland
(74) Attorney, Agent, or Firm — Sughrue Mion, PLLC

(57) ABSTRACT

A computerized data storage system and a method for portioning performance among data areas on a hard disk drive. The system includes a management computer coupled to one or more host computers and a storage apparatus. The storage apparatus includes hard disk drives and a storage controller for partitioning the hard disk drives among data volumes in the storage apparatus and for assigning the data volumes to the host computer. A performance partitioning module utilizes a queue management table for forming a number of queues on memory of the hard disk drive. The queues receive READ and WRITE requests and convey these requests to data areas assigned on recording media of the hard disk drive. After a request from a queue is executed, a gate between the queue and the data areas may be closed to allow requests from other queues an opportunity to access the data areas.

18 Claims, 40 Drawing Sheets

152
Memory

| Queue Management Table ||||||||||
|---|---|---|---|---|---|---|---|---|---|
| HDD Number | Number of Queues | Queue Number | Number of Current Requests | Request Numbers | Tr | Tadj | Mapped Data Area Number | LBA Range | Max Number of Requests in Queue During Last 1 Hour | Queue Busy Ratio |
| 200a | 4 | 310a | 1 | 5000 : | | | 351 | 0~419999999 | 2 | 100% |
| | | 310b | 1 | 5010 : | | | 351 | 0~419999999 | 2 | 100% |
| | | 310c | 0 | | | | 352 | 420000000 ~1259999999 | 0 | 3% |
| | | 310d | 0 | | | | | | 0 | 0% |
| | | | | | | | | | | |
| | | | | | | | | | | |

Fig. 6

| Queue Creation Request ||
|---|---|
| Number of Queues | Qeue Number |
| 4 | 310a |
|  | 310b |
|  | 310c |
|  | 310d |

Fig. 7 (a)

| Data Area Creation Request |||
|---|---|---|
| Data Area Number | LBA Range | Capacity |
| 351 | 0~419999999 | 200GB |
|  |  |  |

Fig. 7 (b)

| Data Area Creation Request |||
|---|---|---|
| Data Area Number | LBA Range | Capacity |
| 352 | 420000000~1259999999 | 400GB |
|  |  |  |

Fig. 8(a)

| Mapping Request | |
|---|---|
| Queue Number | Data Area Number |
| 310a 310b | 351 |

Fig. 8(b)

| Mapping Request | |
|---|---|
| Queue Number | Data Area Number |
| 310c | 352 |

Fig. 8(c)

| Mapping Request | |
|---|---|
| Queue Number | Data Area Number |
| 310a 310b 310d | 351 |

Fig. 8(d)

| Mapping Request | |
|---|---|
| Queue Number | Data Area Number |
| 310a | 351 |

| Performance Information | | | |
|---|---|---|---|
| Data Length | HDD Performance | Number of Queues | Partition Performance |
| 512Bytes | 80iops | 4 | 20iops |
| 4KB | 80iops | | 20iops |
| 64KB | 72iops | | 18iops |
| 1MB | 52iops | | 13iops |

Fig. 10

| Queue Status |||| 
|---|---|---|---|
| HDD Number | Queue Number | Max Number of Requests in Queue During Last 1 Hour | Queue Busy Ratio |
| 200a | 310a | 2 | 100% |
|  | 310b | 2 | 100% |
|  | 310c | 0 | 3% |
|  | 310d | 0 | 0% |
|  |  |  |  |
|  |  |  |  |

| Volume Map ||||
|---|---|---|---|
| Data Volume Number | HDD Number | Capacity | LBA Range |
| 111 | 200a | 200GB | 0~419999999 |
|  | 200b | 200GB | 0~419999999 |
|  | 200c | 200GB | 0~419999999 |
|  | 200d | 200GB | 0~419999999 |
|  | 200e | 200GB | 0~419999999 |
|  |  |  |  |

Fig. 12 (b)

| Volume Map ||||
|---|---|---|---|
| Data Volume Number | HDD Number | Capacity | LBA Range |
| 111 | 200a | 200GB | 0~419999999 |
|  | 200b | 200GB | 0~419999999 |
|  | 200c | 200GB | 0~419999999 |
|  | 200d | 200GB | 0~419999999 |
|  | 200e | 200GB | 0~419999999 |
| 112 | 200a | 400GB | 420000000~1259999999 |
|  | 200b | 400GB | 420000000~1259999999 |
|  | 200c | 400GB | 420000000~1259999999 |
|  | 200d | 400GB | 420000000~1259999999 |
|  | 200e | 400GB | 420000000~1259999999 |
|  |  |  |  |

Fig. 24

Chunk Pool Management Table — 168

| Chunk Number | HDD Number | LBA Range | Allocation Status | Volume Number |
|---|---|---|---|---|
| 10000 | 200a | 0~4095 | | |
| 10001 | 200a | 4096~8191 | | |
| 10002 | 200a | 8192~12287 | | |
| | | ⋮ | | |

| Chunk Table |||||
|---|---|---|---|---|
| Volume Number | Capacity | Segment Number | Allocation Status | Chunk Number |
| 113 | 10000GB | 0 | | |
| | | 1 | | |
| | | 2 | | |
| | | ⋮ | | |
| 16901 | 16902 | 16903 | 16904 | 16905 |

Fig. 26                    2600

| Queue Management Table | | | | | | | | | |
|---|---|---|---|---|---|---|---|---|---|
| HDD Number | Number of Queues | Queue Number | Number of Current Requests | Request Numbers | Tr | Tadj | Data Volume Number | Max Number of Request in Queue Last 1 Hour | Queue Busy Ratio |
| 200a | 4 | 310a | 0 | | | | | | |
| | | 310b | 0 | | | | | | |
| | | 310c | 0 | | | | | | |
| | | 310d | 0 | | | | | | |
| | | | | | | | | | |
| | | | | | | | | | |

Fig. 27(a)

| Data Volume and Queue Mapping Table | | |
|---|---|---|
| Data Volume Number | HDD Number | Queue Number |
| 113 | 200a | 310a |
| | 200b | 310a |
| | | |

Fig. 27(b)

| Data Volume and Queue Mapping Table | | |
|---|---|---|
| Data Volume Number | HDD Number | Queue Number |
| 113 | 200a | 310a |
| | | 310b |
| | | |

METHODS AND APPARATUS FOR ASSIGNING PERFORMANCE TO DATA VOLUMES ON DATA STORAGE SYSTEMS

FIELD OF THE INVENTION

The present invention relates generally to computer storage systems and, more particularly, to estimating and/or allocating performance of data volumes in data storage systems.

DESCRIPTION OF THE RELATED ART

The overall performance of a computer system can be limited by the input/output (I/O) processing of the storage control device. At limit, the storage control device must execute each I/O process at the maximum capacity. Also, the storage control device must simultaneously execute the I/O processing requests from multiple computers and through multiple paths.

In general, cache memory is used as means for improving the performance of a storage control device. Frequently accessed data is left in cache. As the I/O processing load increases, however, waiting time for securing usable cache memory resources increases and the I/O processing throughput decreases. Also, waiting time for securing cache memory resources increases in the case where a number of computers compete for the same cache memory resources at the same time. In the case of competition for securing cache memory resources between high and low priority computers or computing tasks, the processing of the lower priority computer/task will negatively affect the processing of the higher priority computer/task. Shared processor memory established within the storage control device must be provided with channel port priority information for each channel port unit, host priority information for each host computer and device priority information for each device.

To differentiate priority of data volumes available on data storage systems, a method for prioritizing requests issued by host computers, was disclosed in U.S. Pat. No. 7,181,607, titled "Storage Control Apparatus" and issued to Takeshi Ido, et al. Requests, which are issued by host computers, are prioritized by host computer's world wide name (WWN) and executed. The requests with low priority WWN are executed with a specific delay. As a result of the prioritization, performances of data volumes are differentiated.

However in the conventional systems, the performance at each data volume may not be predicted using the conventional methods. Thus, more reliable methods for estimating performance of, as well as partitioning and allocating storage system resources are needed.

SUMMARY OF THE INVENTION

The inventive methodology is directed to methods and systems that substantially obviate one or more of the above and other problems associated with conventional techniques for assigning performance to data volumes in storage systems.

In accordance with one embodiment of the invention, there is provided a computerized data storage apparatus incorporating multiple storage devices and a storage controller configured to partition the storage devices among at least one logical data volume in the storage apparatus and provide the at least one logical data volume to at least one host computer for data access. In the inventive apparatus, each of the storage devices includes multiple performance partitions, at least some of which being assigned to the at least one logical data volume based on performance information.

In accordance with another embodiment of the invention, there is provided a method for dynamically partitioning a recording medium of one or more storage devices for storage of data being utilized by a host computer coupled to the storage devices. The inventive method involves: partitioning each storage device into a plurality of performance partitions; mapping each of the performance partitions onto a data area provisioned on the recording medium of the storage device; receiving requests from the host computer; dispatching the requests to the performance partitions; selecting a selected performance partition, the request from the selected performance partition accessing the data area corresponding to the performance partition; and allocating a time window to the selected performance partition.

In accordance with another embodiment of the invention, there is provided a method for provisioning a dynamic chunk allocation volume on a storage apparatus. The inventive method involves: receiving a data volume allocation request at the storage apparatus, the request including data volume parameters; creating a data volume by dynamically allocating storage chunks to the data volume, the data volume including segments and the chunks including physical blocks of storage devices; updating a chunk table establishing a correspondence between a chunk number, a segment number and a volume number for the data volume; issuing a performance table reporting request to the storage devices, the performance table including a data length, a basic performance for each of the storage devices, number of performance partitions for each of the storage devices and a partition performance for each performance partition; calculating a number of performance partitions required for realizing the data volume allocation request; and updating a data volume and performance partition mapping table establishing a correspondence between each data volume, the storage devices associated with the data volume and performance partition numbers associated with each of the storage devices.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1(*b*) shows an exemplary host computer according to aspects of the invention.

FIG. 1(*c*) shows an exemplary memory of a storage apparatus according to aspects of the invention.

FIG. 1(*d*) shows an exemplary management computer system according to aspects of the invention.

FIG. 1(*e*) shows an exemplary hard disk drive according to aspects of the invention.

FIG. 4 shows an example of a queue management table according to aspects of the invention.

FIG. 6 shows an example of a queue creation request according to aspects of the invention.

FIGS. 7(a) and 7(b) show examples of the data area creation request according to aspects of the invention.

FIGS. 8(a), 8(b), 8(c) and 8(d) shows examples of the mapping request according to aspects of the invention.

FIG. 9 shows an example of the performance information report according to aspects of the invention.

FIG. 10 shows a queue status table that includes a subset of the information in the queue management table according to aspects of the invention.

FIGS. 12(a) and 12(b) show updated volume maps.

FIGS. 22 to 33 relate to another exemplary information system according to the aspects of the invention.

FIG. 22 shows an exemplary information system for implementing the aspects of the present invention.

FIG. 23 shows a relationship between a WRITE command, the dynamic chunk allocation DCAV, the chunk pool, and chunks of the HDDs according to aspects of the invention.

FIG. 24 shows a chunk pool management table according to aspects of the invention.

FIG. 25 shows a chunk table for the DCAV according to aspects of the invention.

FIG. 26 shows a queue management table according to aspects of the invention.

FIGS. 27(a) and 27(b) show a data volume and queue mapping table according to aspects of the invention.

FIG. 28 shows a flow diagram for an exemplary method of creation of the DCAV according to aspects of the invention.

FIG. 29 shows a flow diagram for carrying out the WRITE process according to aspects of the invention.

FIG. 30 shows a flow diagram for the READ process according to aspects of the invention.

FIG. 31 shows an example of the random chunk allocation according to aspects of the invention.

FIG. 32 shows a flow diagram for assigning a queue for performance improvement according to aspects of the invention.

FIG. 33 shows an example of chunk migration among HDDs according to aspects of the invention.

DETAILED DESCRIPTION

Figure 1:
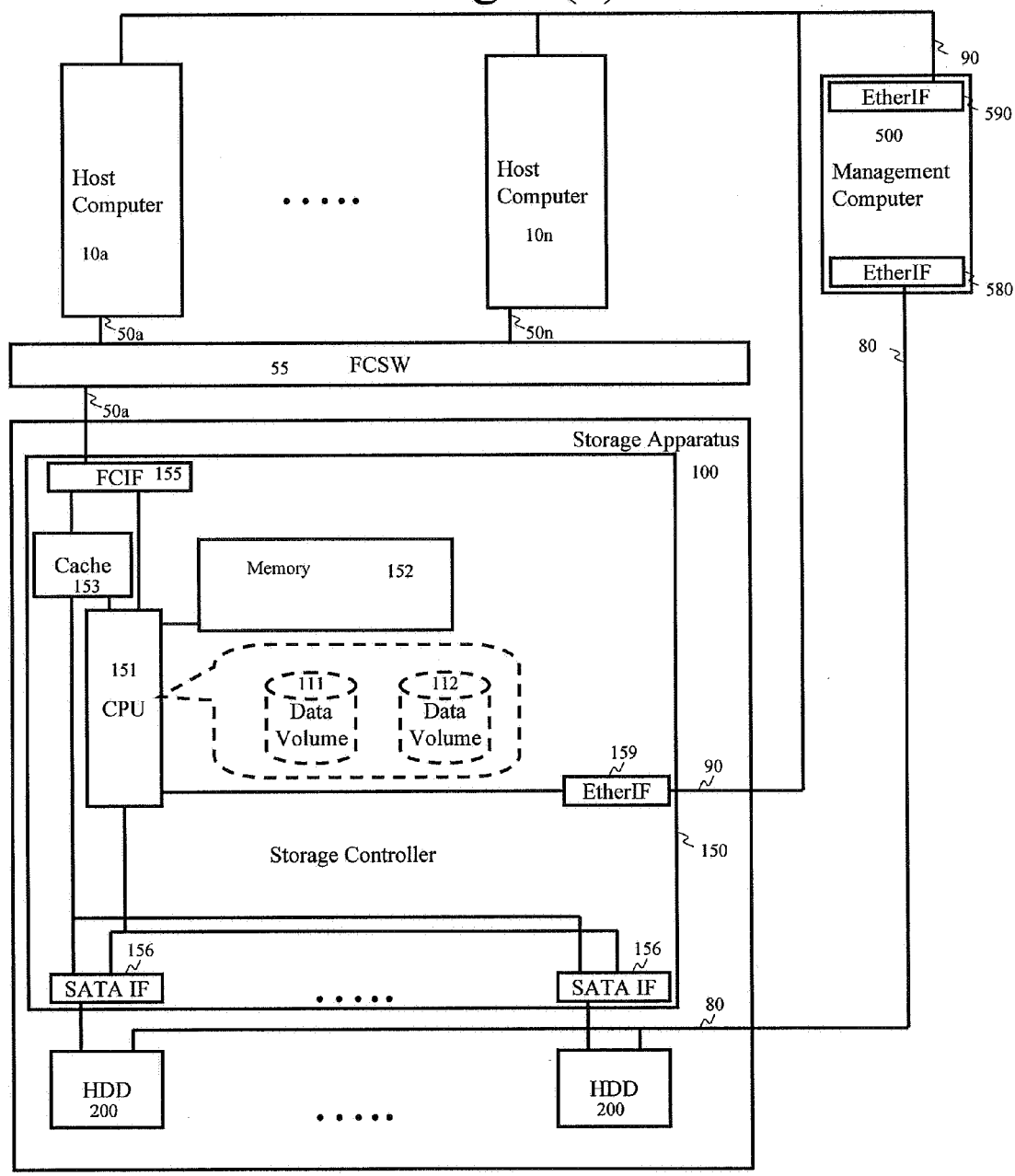
FIG. 1(*a*) shows an exemplary information system for implementing a method according to aspects of the invention.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Performance of a hard disk drive or a flash memory drive is dominant at the data volume. Aspects of the present invention are related to a method and an apparatus for assigning performance values to data volumes on a data storage apparatus. The performance value for each data volume is assigned when the data volume is created on the data storage apparatus. Free capacity and free performance are pooled to allocate the data volume to a host computer that requires the specified performance. Aspects of the present invention provide a method and an apparatus for assigning a specific part of the hard disk drive or the flash memory drive to a data volume for controlling and differentiating data volume performance.

When the storage apparatus includes a number of hard disk drives or a number of flash memory drives, the performance partitioning functionalities are implemented on each hard disk drive or each flash memory drive. One of the aspects of the present invention partitions performance at hard disk drive or flash memory drive by establishing queues in the hard disk drive and controlling time windows corresponding to each queue. In this aspect of the invention, a hard disk drive or a flash memory drive has an interface for defining the number of queues. Either the storage apparatus or a storage management computer assigns one or more of the queues to a data volume when the data volume is created in the storage apparatus. Number of queues assigned to each data volume is managed according to performance information, which is provided by an administrator or a host computer. For increasing or decreasing the required performance, the number of queues allocated is increased or decreased. Data may be transferred, or caused to migrate, from one hard disk drive to another if the relationship between a queue and data storage area is imbalanced.

FIG. 1(a) shows an exemplary information system for implementing a method according to aspects of the invention.

In one exemplary information system according to aspects of the invention, a storage apparatus including hard disk drives (HDDs) is coupled to at least one host computer and controlled by a management computer. The storage apparatus includes a storage controller that forms data volumes in the storage apparatus and assigns the data volumes to the host computers.

Each of the host computers includes a data volume allocation request program residing on its memory. The data volume allocation request program requests for allocation of data volumes on the storage apparatus. Data, required by the operating system of the host computer and by the application programs running on the host computer, are stored on the data volumes that are created on the storage apparatus.

The storage apparatus stores and executes a response program for responding to a READ/WRITE command from a host computer, a volume allocation program for creating the data volumes and allocating them to a host computer, and a volume map reporting program for reporting volume mapping information to the management computer. A storage controller is used for providing the data in the data volumes to the host computers.

The storage apparatus also includes the HDDs that are used for storing the data that is provided to the host computer through the data volumes. Memory of each of the HDDs stores two tables and stores and executes three programs. The programs include a response program for responding to a READ/WRITE command from the host computer, a performance partitioning program for adjusting request execution among a number of queues, and a performance partitioning management program for configuring a queue management table and a queue status table. The tables include the queue management table for showing the logical block addressing (LBA) range for each of the queues and a performance table for holding HDD's basic performance information such as the number of I/O operations per second (iops). The queue status table is an abbreviated form of the queue management table that contains the queue busy ratio for each queue.

The management computer stores and executes a data volume provisioning request program for sending a request to the storage apparatus, a HDD performance partitioning request program for requesting partitioning for a HDD and a performance monitoring program for monitoring queue status and adjusting the partitioning of a data volume among the HDDs.

The information system shown in FIG. 1 includes one or more host computers 10, a data network 50, a fiber channel switch 55, a HDD management network 80, a management network 90, a storage apparatus 100, and a management computer 500. At least one host computer 10 is coupled to the storage apparatus 100 via the data network 50. In the exemplary embodiment shown, two host computers are coupled to the storage apparatus 100.

Figure 1B:
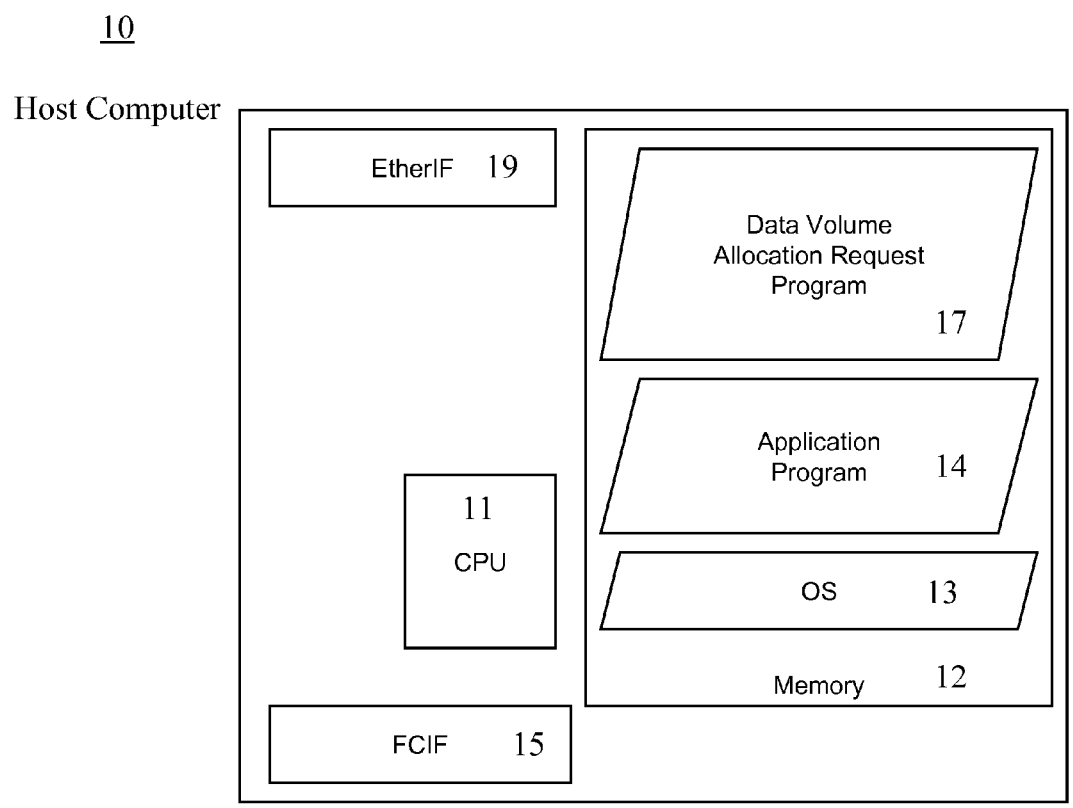
FIG. 1(f) shows the components shown in FIGS. 1(b), 1(c), 1(d) and 1(e).

FIG. 1(b) shows an exemplary host computer according to aspects of the invention.

Each of the host computers 10 includes a CPU 11 for executing programs stored in a memory 12, the memory 12 for storing the programs and data, a fibre channel interface board (FCIF is used in figures) 15 for connecting to the data network 50, and an Ethernet interface (EtherIF) 19 for connecting to the management network 90 and at least three programs executed by CPU11. In the exemplary embodiment shown, the memory 12 stores an operating system (OS) program 13, an application program 14, and a data volume allocation request program 17. The OS 13 is operating within the memory 12 and the application program 14 may be executed on the OS 13. Files and data required for the OS 13 and the application program 14 are stored in data volumes, which are provided by the storage apparatus 100. The OS 13 and the application program 14 issue WRITE and/or READ commands to the storage apparatus 100.

The data network 50 is used to couple together the host computer 10 and the storage apparatus 100. In one aspect of the invention, the data network 50 may be Fibre Channel (FC). However other types of network, such as Ethernet and Infiniband may also be used. Network switch and hub can be used for connecting various elements of the data network. In the exemplary embodiment shown, a Fibre Channel Switch (FCSW) 55 is used for connecting the elements of the data network 50 when the data network 50 is a FC network. The host computer 10 and the storage apparatus 100 are shown as having one or more Fibre Channel interface board (FCIF) 15, 155 for connecting to the FC data network 50.

The HDD management network 80 is used to couple together a number of HDDs 200a, 200b, 200c, 200d, 200e included in the storage apparatus 100. The HDD management network 80 may be Ethernet or other network and data transfer means such as RS232C. Network switches and hubs can be used for connecting the devices to the network. The HDDs 200a, 200b, 200c, 200d, 200e and the management computer 500 each have one or more interfaces 19, 159 for connecting to the HDD management network 80.

The management network 90 is used to couple together the management computer 500 to the host computer 10 and the storage apparatus 100. In one exemplary embodiment, the management network 90 is Ethernet. However, other types of networks can be used. Network switches and hubs can be used for connecting the network to the devices. The host computer 10, the storage apparatus 100 and the management computer 500 each include one or more network interface boards, such as the Ethernet interface boards (EtherIF) 19, 159, 580, for connecting to the management network 90.

The storage apparatus 100 includes a storage controller 150 and one or more HDDs. In the exemplary embodiment shown, five HDDs 200a, 200b, 200c, 200d, 200e are coupled together and to the storage controller 150. The HDDs are coupled to the management computer 500 via the HDD management network 80 while the storage apparatus 100 is coupled to the management computer 500 via the management network 90.

The one or more HDDs may be used for storing data and the storage controller 150 may be used for providing data volumes to the host computers.

The storage controller 150 includes a CPU 151 for executing programs stored in a memory 152, the memory 152 for storing programs and data, a FCIF 155 for connecting to the data network 50, a Serial Advanced Technology Attachment interface (SATA IF) 156 for connecting to the HDD 200 or another type of interface compatible with the HDD, a cache 153 for storing data received from the host computer and read from the HDD, and an EtherIF 159 for connecting to the management network 90. At least three programs are executed by CPU 151.

Figure 1C:
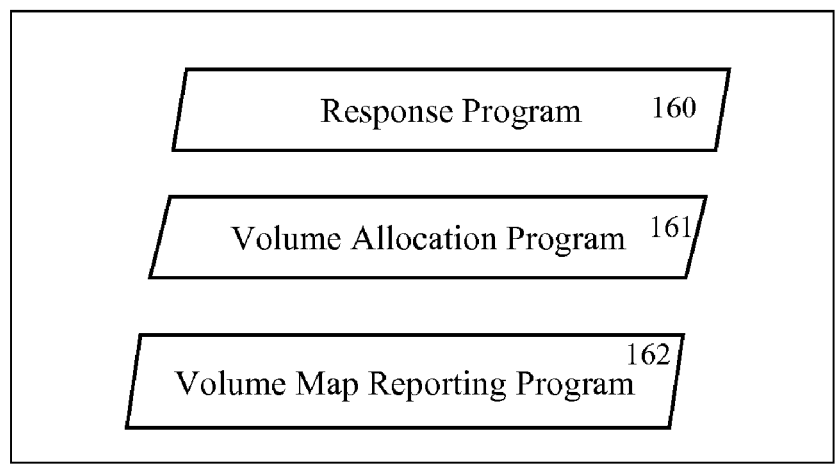
Figure 1:
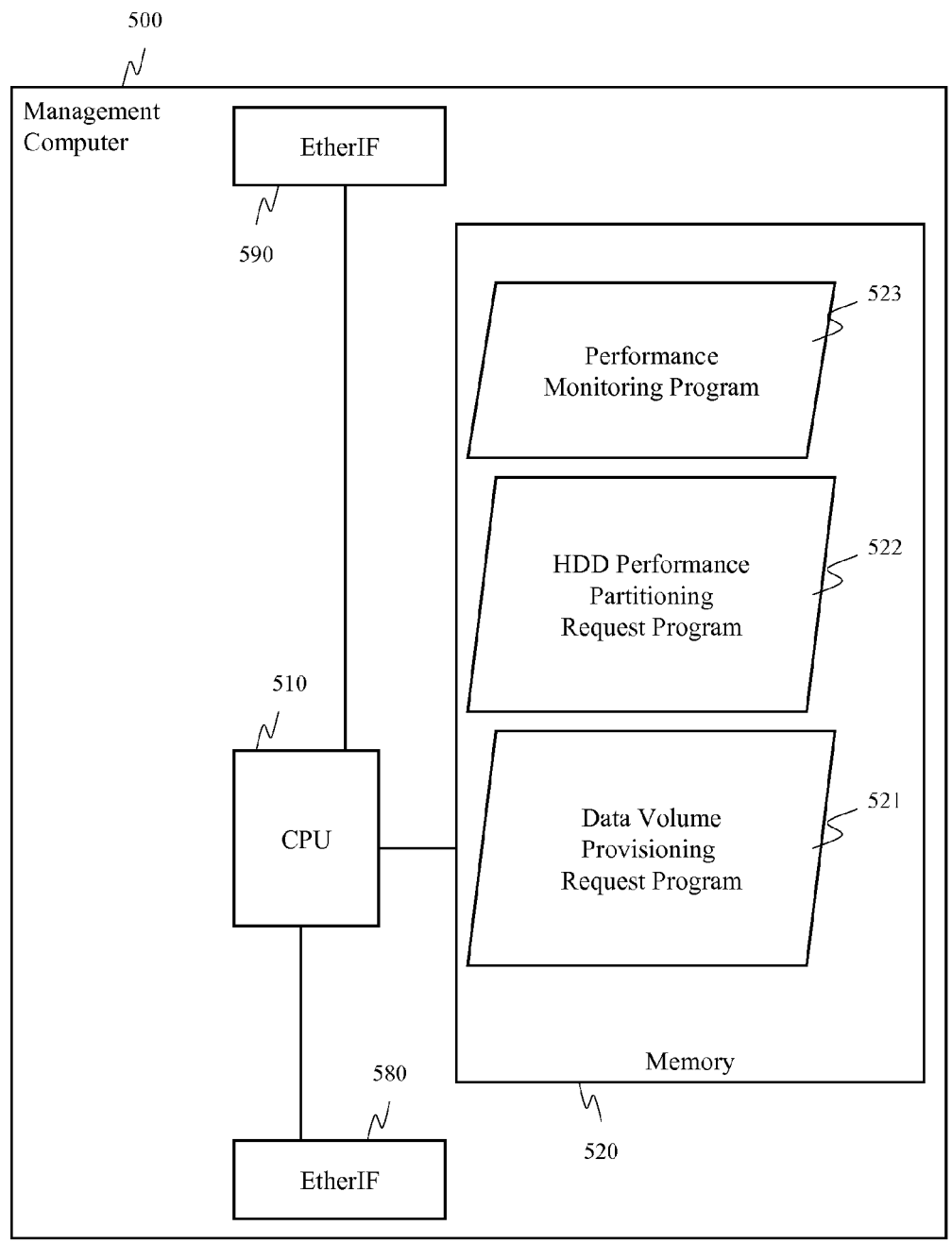

FIG. 1(c) shows the memory 152. In the exemplary embodiment shown, the memory 152 stores a response program 160 for responding to a READ/WRITE command from the host computer 10, a volume allocation program 161 for creating data volumes and allocating it to a host computer 10, and a volume map reporting program 162 for reporting volume mapping information to the management computer 500 via the management network 90.

The management computer 500 is a centralized management computer and is coupled the storage apparatus 100 and the host computer 10 via the management network 90.

FIG. 1(d) shows an exemplary management computer system of FIG. 1(a) according to aspects of the invention.

In one exemplary embodiment, the management computer 500 may include a CPU 510 for executing programs stored in a memory 520, the memory 520 for storing the programs and data, an EtherIF 580 for connecting to the HDD management network 80, an EtherIF 590 for connecting to the management network 90, and at least three programs executed by CPU 510.

In the exemplary embodiment shown, the memory 520 stores a data volume provisioning request program 521, a HDD performance partitioning request program 522 and a performance monitoring program 523. The data volume provisioning request program 521 is for issuing a data volume creation request to the storage apparatus 100. The HDD performance partitioning request program 522 is for issuing a HDD performance partitioning request to the HDD 200. The performance monitoring program 523 is for monitoring queue status and adjusting performance.

Figure 1E:
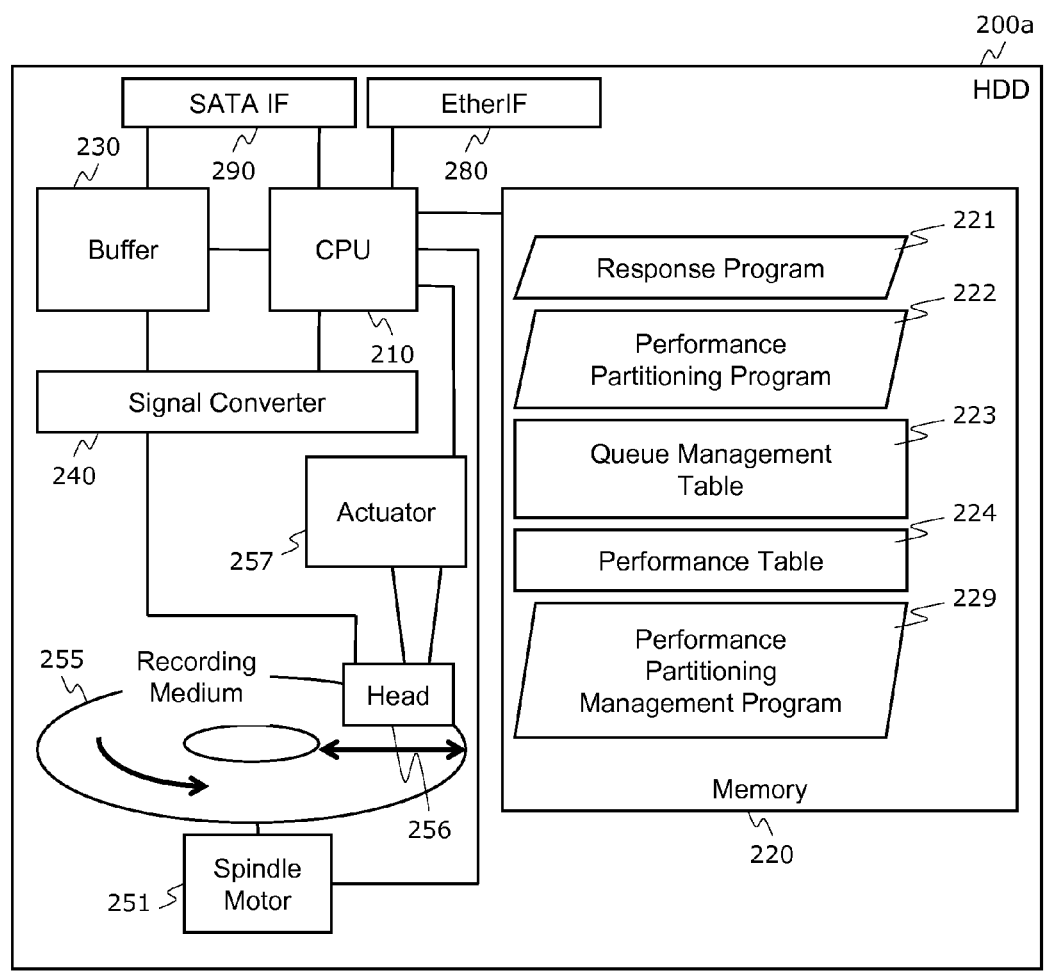

FIG. 1(e) shows an exemplary hard disk drive of FIG. 1(a) according to aspects of the invention.

One exemplary embodiment of the HDDs includes a CPU 210 for executing programs stored in a memory 220, a memory 220 for storing programs and data, a buffer 230 for storing data received from the storage apparatus 100 via SATA IF 290 and read from the recording medium, a signal converter 240 for converting data bit stream to magnetic recording signal and magnetic recording signal to data bit stream, a spindle motor 251 for rotating recording medium 255, a recording medium 255 for storing data, a recording head 256 for writing data to the recording medium and reading data from the recording medium, an actuator 257 for positioning the head on data track on recording medium 255, an EtherIF 280 for connecting to the HDD management network 80, and a SATA IF 290 for connecting to the SATA connection.

The recoding medium 255 has a number of data tracks and data sectors on the data track for storing data. The recording head 256 is positioned according to LBA in a READ/WRITE request. Further, in the embodiment shown, the SATA IF 290 is coupled to the storage controller 150.

At least three programs are executed by CPU 210. In the embodiment shown, the memory 220 stores a response program 221 for responding to READ/WRITE command from the storage apparatus 100, a performance partitioning program 222 for adjusting request execution among a number of queues, a queue management table 223 for keeping relation between LBA range and queues, a performance table 224 for holding HDD's basic performance information, and a performance partitioning management program 229 for configuring performance queue management table and reporting queue status.

Figure 1F:
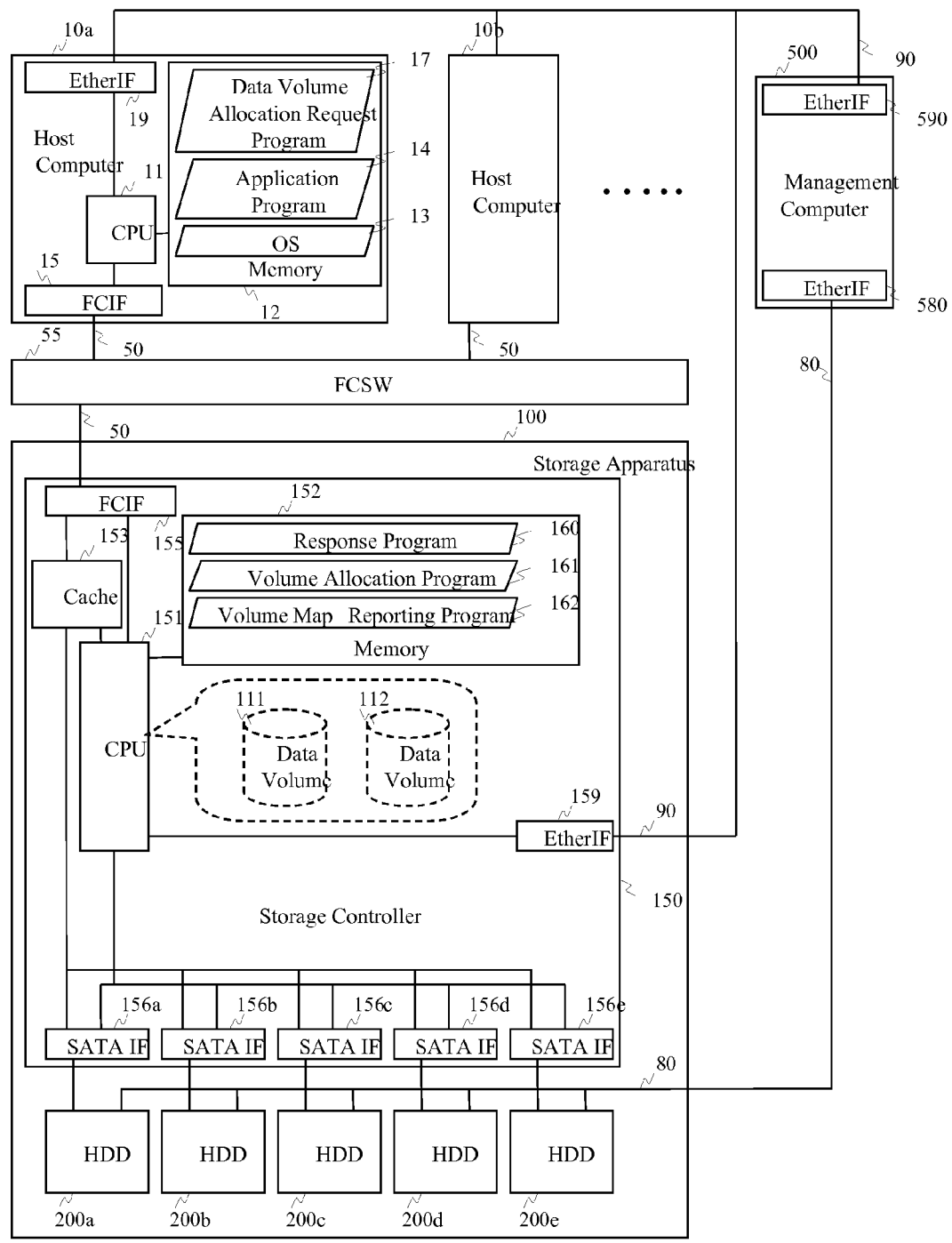

FIG. 1(f) shows the components shown in FIGS. 1(b), 1(c), 1(d) and 1(e) together and presents another version of FIG. 1(a) where five HDDs and their associated SATA IF are shown and distinguished by labeling.

Figure 2:
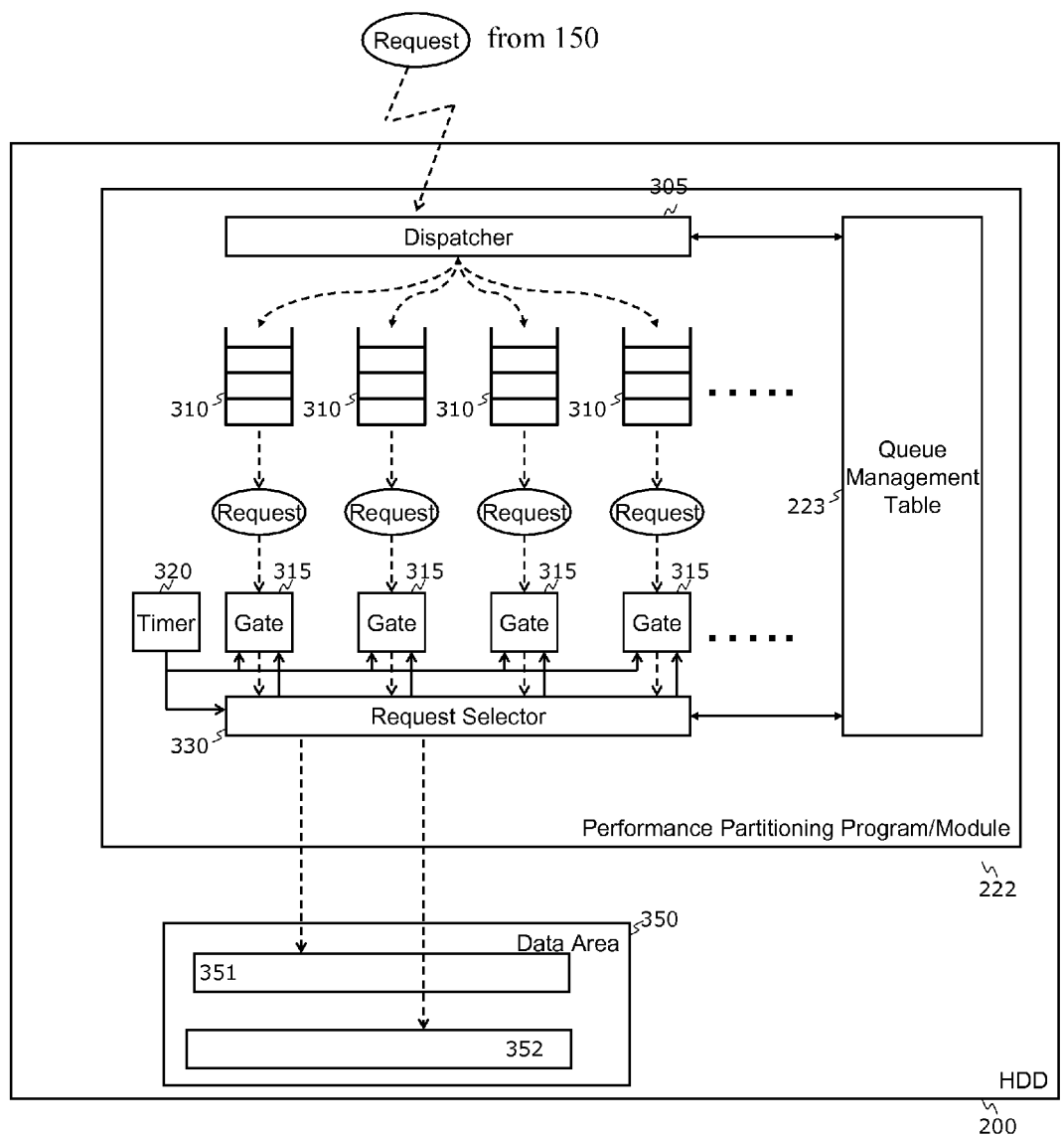
FIG. 2 shows an exemplary performance partitioning management program of a HDD according to aspects of the invention.

FIG. 2 shows an exemplary performance partitioning management program of an HDD according to aspects of the invention.

The performance partitioning module at the HDD receives a request from the HDD performance partitioning request program of the management computer. This request is dispatched to a queue in the performance partitioning module of the HDD according to the correspondence between the queue numbers and the request numbers that is available from the queue management table on the HDD. The performance partitioning management program of the HDD, provides time sharing of the recording head and allocates time for each queue. The recording medium of the HDD is divided into one or more data areas. The queue management table is updated according to the data area creation request. The performance partitioning program of the HDD includes gates that are adapted for controlling the time window at each queue and a request selector selects an appropriate request from the queues according to gate status. The selected request, such as READ or WRITE, is carried out by the recording head on the data area allocated on the recording medium.

A HDD is shown that is similar to the HDD 200 of FIG. 1 and includes the performance partitioning program or module 222 and a data area 350 that is located on the recording medium 255. The performance partitioning module 222 includes a dispatcher 305, a timer 320, a queue management table 223, a request selector 330, one or more queues 310, and one or more gates 315 corresponding to the queues.

The dispatcher 305 is adapted for dispatching a request to one of the queues according to the queue management table 223 that establishes a relationship between a queue number and a request number. The queues are used for queuing the request. In the embodiment shown, a request is dispatched according to an LBA information stored in the request. In the embodiment shown four queues 310 are provided. The number of queues depends on system design and may vary. The HDD performance partitioning request program 522 on the management computer 500 issues queue creation requests for partitioning the performance of the HDD by creating the queues in the HDD.

The gates are adapted for controlling the time window at each queue and the timer 320 is for providing the current time to the gates and to the request selector 330. The request selector 330 is for selecting an appropriate request from the queues according to gate status. The selected request is executed on the data area 350 allocated on the recording medium 255. The selected request may be a READ or WRITE request that is carried out by the recording head.

The performance partitioning functionality of the performance partitioning management module 229, provides time sharing of the recording head 256 and allocates time for each queue. Performance partitioning functionality can be implemented as software or hardware logic. A data area 351 and a data area 352 are created in the data area 350 of each of the HDDs. The queue management table 223 is updated according to the data area creation request.

Figure 3:
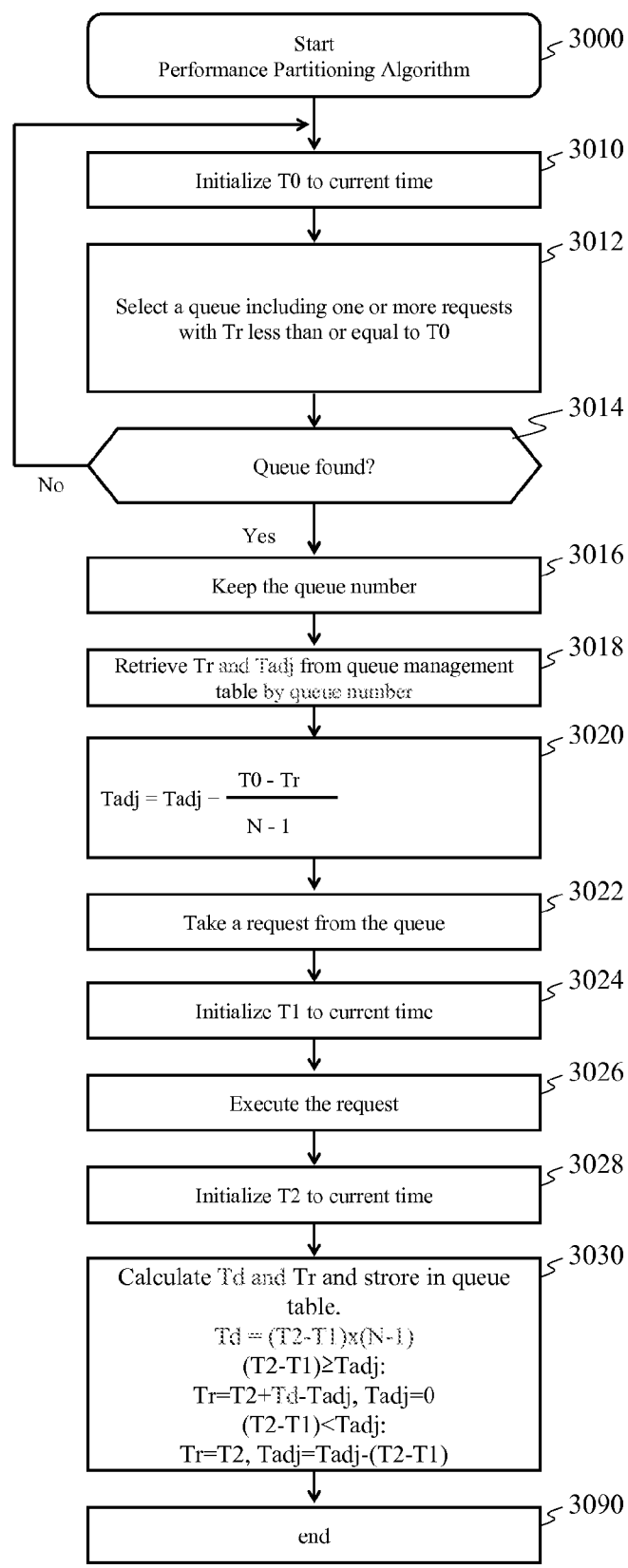
FIG. 3 shows a flow chart for conducting performance partitioning according to aspects of the invention.

FIG. 3 shows a flow chart for conducting performance partitioning. The process of FIG. 3 may be performed by the performance partitioning module or program 222.

The performance partitioning process begins at 3000. At 3010, a variable T0 is initialized to current time by the timer 320. At 3012, a queue which has one or more requests is selected such that a variable Tr associated with the queue is less than or equal to T0. The variable Tr is the queue ready time associated with each queue. Tr is a point in time, rather than a duration of time. Therefore, the queue ready time Tr has to occur before the current time T0 in order for the queue to be ready for sending its requests to the data area for execution. In the queue management table 223 of FIG. 4, the number of current requests in the queue is listed. If this number is one or more, then the queue includes one or more requests. The Tr and Tadj values associated with each queue are stored in the queue management table 223. The queue ready time for each queue is updated and stored every time a request from that particular queue is executed and Tr has to be less than or equal T0 for the requests from the queue to be sent for further processing. If a number of queues are found that include one or more requests, a queue with the smallest Tr is selected. This would correspond to the queue that was ready earlier than the other queues that are all waiting to send their requests for READ or WRITE to the data area. At 3014, if no queue is found that satisfies the condition, then the process returns to 3010 and begins looking for a queue that satisfies these conditions anew.

At 3016 the queue number is retained and at 3018 a corresponding Tr and Tadj are retrieved from the queue management table 223. At 3020, a variable Tadj is calculated and used to adjust a next value of Tr. Tadj is calculated from the following equation:

$$Tadj=Tadj+(T0-Tr)/(N-1)$$

where N is the number of queues in the performance partitioning program 222. For example, in the embodiment shown in FIG. 2, N=4. Initially, Tadj=0 and Tadj=(T0-Tr)/(N-1). This equation divides the time difference between the current time and time at which the queue is done waiting and is ready to send its request to the data area by the number of queues other than the queue that just had its request executed. In the case of N is one, step 3020 is ignored.

At 3022, a request is taken from the queue whose queue number was retained at 3016. At 3024, a variable T1 is initialized to current time by the timer. At 3026, the request is executed on the recording medium as a READ or WRITE operation performed by the recording head on the recording medium. At 3028, a variable T2 is initialized to the current time by the timer. The current time after the execution is complete is of course later than the current time when the execution began and T2>T1.

At 3030, the variable Td and Tr is calculated and stored in the queue management table 323. When (T2-T1) is greater than or equal to Tadj, the variables Td, Tr and Tadj are calculated from the following equations:

$$Td=(T2-T1)\times(N-1)$$

$$Tr=T2+Td-Tadj$$

$$Tadj=0$$

The above equation for Tr appears to force the selected queue to wait for a period as long as the time it took to execute its request multiplied by the number of queues other than itself. So, the method appears to allow as much time as the selected queue took for each one of the queues that had to wait for the selected queue.

When (T2-T1) is less than Tadj, the variables Tr and Tadj are calculated from the following equations:

$$Tr=T2$$

$$Tadj=Tadj-(T2-T1)$$

The above equation for Tr appears to permit the selected queue to begin sending out its requests for execution immediately without any wait. This happens when the duration needed for execution of the request, T2-T1, is short and is smaller than the Tadj that was calculated in step 3020 as (T0-Tr)/(N-1). So, because the request will be executed quickly, without imposing on the other queues, the program allows the queue to execute its request back to back. The adjusting time Tadj is also reduced from its former value.

At step 3090, the process terminates.

FIG. 4 shows an example of the queue management table 223. The queue management table 233 includes the HDD number, the number of queues in the HDD, the queue number of each of the queues, the number of current requests, the request numbers for the request in each of the queues (this cell can hold plural request numbers), the Tr, the Tadj, the mapped data area number corresponding to each of the queues, the LBA range corresponding to each mapped data area number, the maximum number of requests in each queue during the last 1 hour to be used for the performance report, and the queue busy ratio for the performance report.

Figure 5:
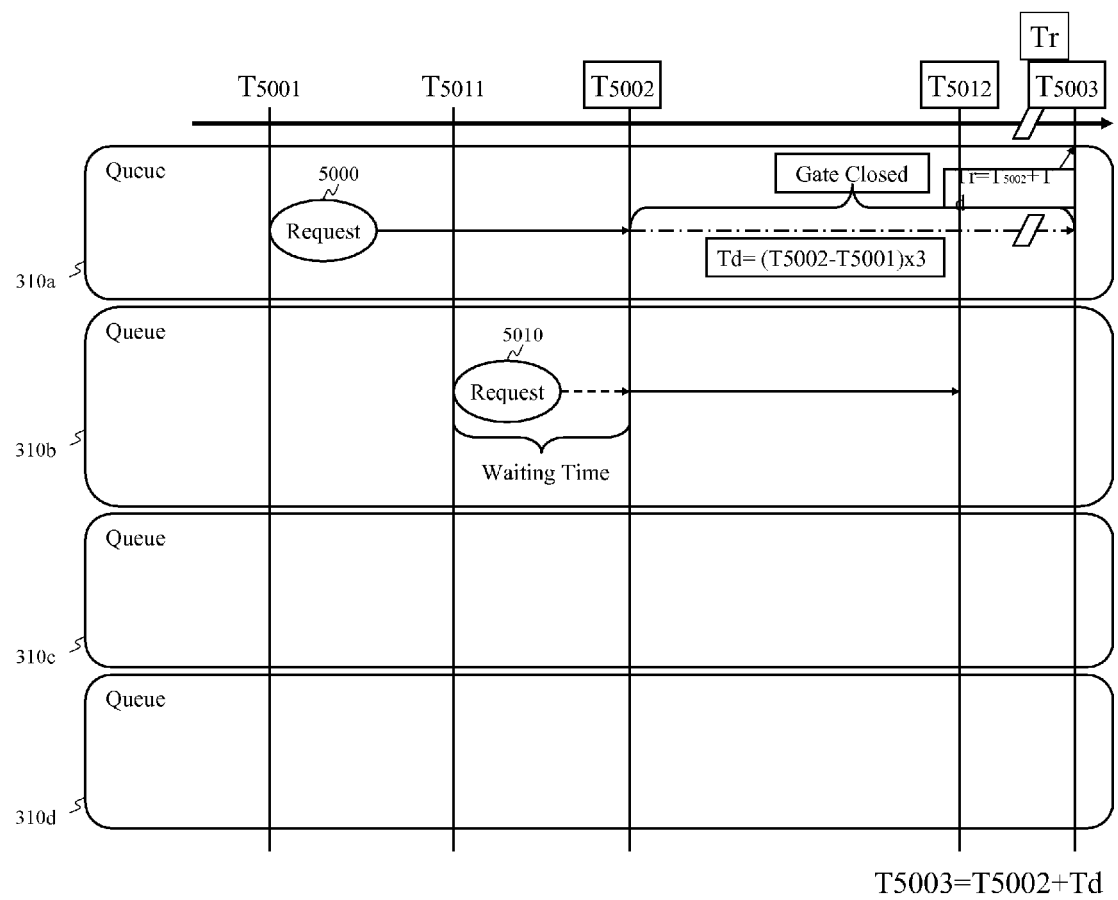
FIG. 5 shows an example of a process for performance partitioning according to aspects of the invention.

FIG. 5 shows an example of a process for performance partitioning according to aspects of the invention.

In FIG. 5, a request 5000 is queued in queue 310*a* at time T5001. For queue 310*a*, time T1 for queue 1, T11=T5001. At this time, there are no other requests in the other queues and there are no other requests before the request 5000 in queue 310*a*. Therefore, the request 5000 is selected for execution. The execution of request 5000 is started at time T5001 and completed at time T5002. For queue 310*a*, time T2 for queue 1, T12=T5002. The time between time T5001 and time T5002 includes seek time, medium rotation latency and data transfer time. Td and Tr is calculated according to the equation given at step 3030 in FIG. 3. The gate 315*a* is closed after time T5002 for the duration of Td. The gate 315*a* remains closed until time T5003. For queue 310*a*, time T3 for queue 1, T13=T5003.

This is the first round so the starting Tadj1=0 and (T12-T11) is greater than Tadj1. So, Td1=T12+(T12-T11)×(N-1)= (T5002-T5001)×3, Tr1=T12+Td1-Tadj1=T5002+(T5002-T5001)×3-0 and Tadj1=0. During Td (from T5002 to T5003), the gate 315*a* corresponding to queue 310*a* is closed and no more requests from this queue are send for execution.

A request 5010 is queued in queue 310*b* at time T5011. T5011 is T21 for queue 310*b*. At the time T5011, the request 5000 is executing. The request 5010 is held in the queue 310*b* until the execution of the request 5000 is complete. The request 5010 begins execution at time T5002 when the request 5000 has been completed. Execution of the request 5010 is completed at time T5012. T5012 is T22 for queue 310*b*. The time between time T5011 and time T5012 includes the waiting time for completion of the request 5000, seek time, medium rotation latency, and data transfer time. So Tadj2 is calculated according to the equation given at 3020 in FIG. 3. Tadj2=Tadj2+(T5002-T21)/(N-1)=0+(T5002-T5011)/(3), Next, Td2 and Tr2 for the second queue 310*b*, Tr2, is calculated and adjusted by Tadj2 according to the equation given at 3030 in FIG. 3. Td2=(T22-T21)/(N-1)= (T5012-T5002)×3, Tr2=T21+Td2-Tadj2=T21+(T5012-T5002)×3-(T5002-T5011)/(3).

During Td2 (from T5012 to T5012+Td2), the gate 315*b* remains closed and no requests from the queue 310*b* corresponding to gate 315*b* are processed.

As a result of closing each gate 315 during the calculated Td, almost same time window may be eventually provided to each queue. Closing of a gate after a request from its corresponding queue has been processed prevents a particular queue from hogging the storage resources. In the embodiment shown in FIG. 2, the number of queues N is 4, therefore performance of HDD 200 is partitioned into four time allotments.

The performance partitioning management program 229, that is located in the memory of the HDD 200, is adapted for processing the following requests: a queue creation request for creating queues, a data area creation request for creating data areas in the HDD, a mapping request for mapping a queue to a data area, a performance information report for getting performance information for the HDD, and a queue status report for getting queue status. An example of the queue creation request is shown in FIG. 6. Examples of the data area creation request are shown in FIGS. 7(a) and 7(b). Examples of the mapping request are shown in FIGS. 8(a), 8(b), 8(c) and 8(d). An example of the performance information report is shown in FIG. 9. FIG. 10 shows a queue status table that includes a subset of the information in the queue management table 223.

The performance information report in FIG. 9 includes two parts. The basic performance is provided by HDD vendors. The basic performance is measured and stored when the HDD was shipped. The partition performance is calculated from basic performance and the number of queues. The queue status in FIG. 10 includes maximum number of requests in each queue during the last 1 hour and queue busy ratio in the embodiment shown. The queue busy ratio is calculated from the no request time and provided time window at the queue.

Figure 11:
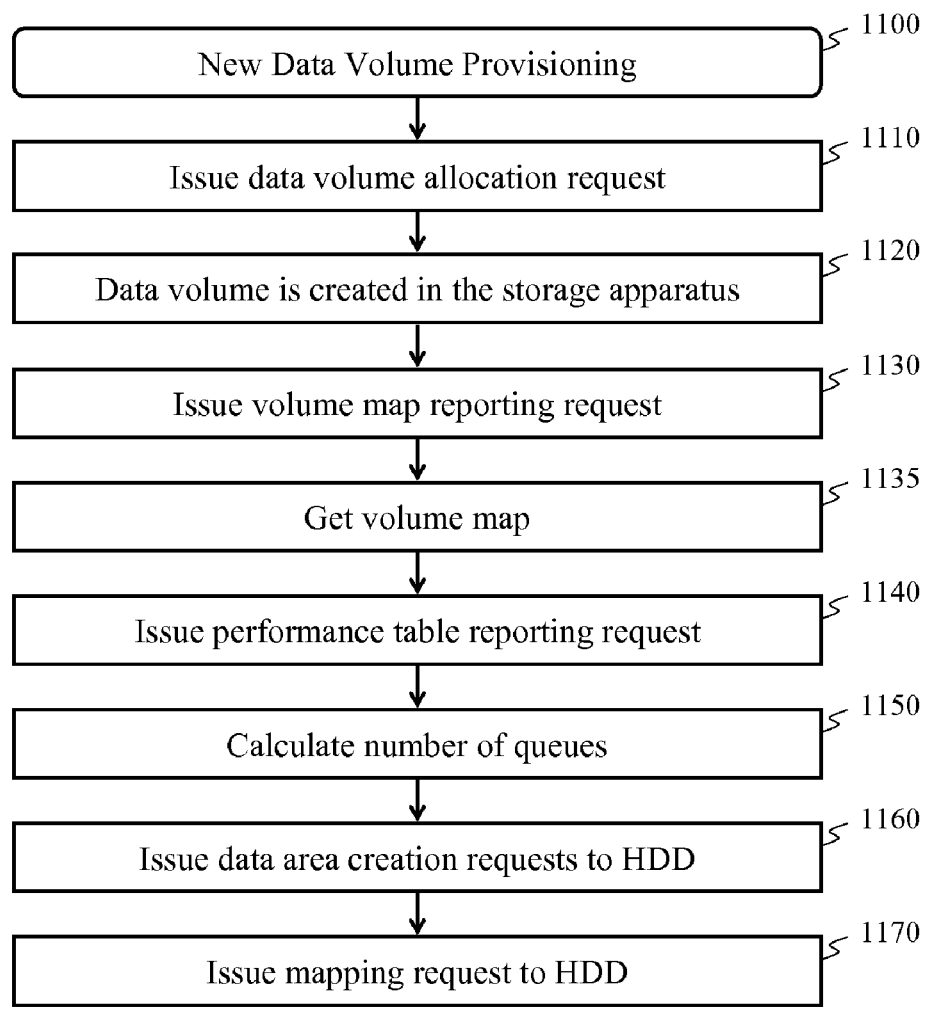
FIG. 11 shows a flow diagram for an exemplary method for new data volume provisioning according to aspects of the invention.

FIG. 11 shows a flow diagram for an exemplary method for new data volume provisioning. For example, creation of the data volume 111 of FIG. 1 is explained according to the process flow.

At 1110, the data volume provisioning request program 521 in the management computer 500 issues a data volume allocation request to the storage apparatus 100. An administrator can provide parameters for data volume or the data volume allocation request program 17 on the host computer 10 can issue a data volume allocation request to the management computer 500. In the embodiment shown a 1000 GB data volume is requested by an administrator through the management computer 500. The administrator also requests 600 iops, for the average number of I/O operations, at 4 KB data access.

At 1120, the volume allocation program 161 in the storage apparatus 100 creates volume 111. The volume map is updated as shown in FIGS. 12(a). In the embodiment shown the 1000 GB data volume is created on five HDDs 200a, 200b, 200c, 200d, and 200e. Each HDD provides 200 GB data area.

At 1130, the data volume provisioning request program 521 issues a volume mapping reporting request to the volume map reporting program 162.

At 1135 the volume map reporting program 162 returns a volume map to the management computer 500. The volume map shown in FIG. 12(a) is reported. The management computer 500 receives the volume map.

At 1140, the data volume provisioning request program 521 issues performance table reporting requests to HDDs. In the embodiment shown, the performance table shown in FIG. 9 is reported by the performance partitioning management program 229.

At 1150, the data volume provisioning request program 521 calculates the number of queues for realizing the administrator's performance request. In the embodiment shown, the administrator's request is 600 iops at 4 KB data access and the new data volume 111 includes of five HDDs. Each HDD has four queues. To achieve 600 iops at 4 KB data access, two queues at each HDD are required such that 80 iops×5HDD×2 queues=800 iops>600 iops.

At 1160, the data volume provisioning request program 521 issues data area creation requests. In the embodiment shown, five data area creation requests shown in FIG. 7(a) are created and issued to five HDDs 200a, 200b, 200c, 200d, and 200e. A data area 351 is created in each HDD 200a, 200b, 200c, 200d, 200e. The queue management table 223 is updated according to the data area creation request.

At 1170, the data volume provisioning request program 521 issues mapping requests. In the embodiment shown, five mapping requests shown in FIG. 8(a) are created and issued to five HDDs. The queues 310a and 310b are assigned to the data area 351 in each HDD. The queue management table 323 is updated according to the data area creation request.

Creation of the data volume 112 may also be explained according to the flow chart of FIG. 11.

At 1110, the data volume provisioning request program 521 in the management computer 500 issues a data volume allocation request to the storage apparatus 100. An administrator can provide parameters for data volume or the data volume allocation request program 17 on the host computer 10 can issue a data volume allocation request to the management computer 500. In the embodiment shown, a 2000 GB data volume is requested by an administrator through the management computer 500. The administrator also requests 50 iops at 1 MB data access.

At 1120, the volume allocation program 161 in the storage apparatus 100 creates volume 112. The volume map is updated as shown in FIG. 12(b). In the embodiment shown, the 2000 GB data volume is created on five HDDs. Each HDD provides 400 GB data area.

At 1130, the data volume provisioning request program 521 issues a volume mapping reporting request to the volume map reporting program 162.

At 1135, the volume map reporting program 162 returns a volume map to the management computer 500. The volume map shown in FIG. 12(b) is reported. The management computer 500 receives the volume map.

At 1140, the data volume provisioning request program 521 issues performance table reporting requests to the HDDs. In the embodiment shown, the performance table shown in FIG. 9 is reported by the performance partitioning management program 229.

At 1150, the data volume provisioning request program 521 calculates number of queues for realizing the administrator's performance request. In the embodiment shown, the administrator's request is 50 iops at 1 MB data access and the new data volume 112 includes five HDDs. Each HDD 200/300 has four queues. To achieve 50 iops at 1 MB data access, one queue at each HDD is required such that 13 iops×5 HDD×1 queue=65 iops>50 iops.

At 1160, the data volume provisioning request program 521 issues data area creation requests. In the embodiment shown, five data area creation requests shown in FIG. 7(b) are created and issued to five HDDs. A data area 352 is created in each HDD. The queue management table 223 is updated according to the data area creation request.

At 1170, the data volume provisioning request program 521 issues mapping requests. In the embodiment shown, five mapping requests shown in FIG. 8(b) are created and issued to five HDDs. The queue 310c is assigned to the data area 352 in HDD 200a-200e. The queue management table 223 is updated according to the data area creation request.

As mentioned above, two data volume 111 and 112 are created and their performances are controlled independently by the performance partitioning program 222 in the HDD 200. In the embodiment shown, the HDD has four queues. The HDD can have more queues for assigning performance in fines. The HDD performance partitioning request program 522 on the management computer 500 can issues a queue creation request with appropriate number of queues for optimizing system configuration at system initialization phase.

Figure 13:
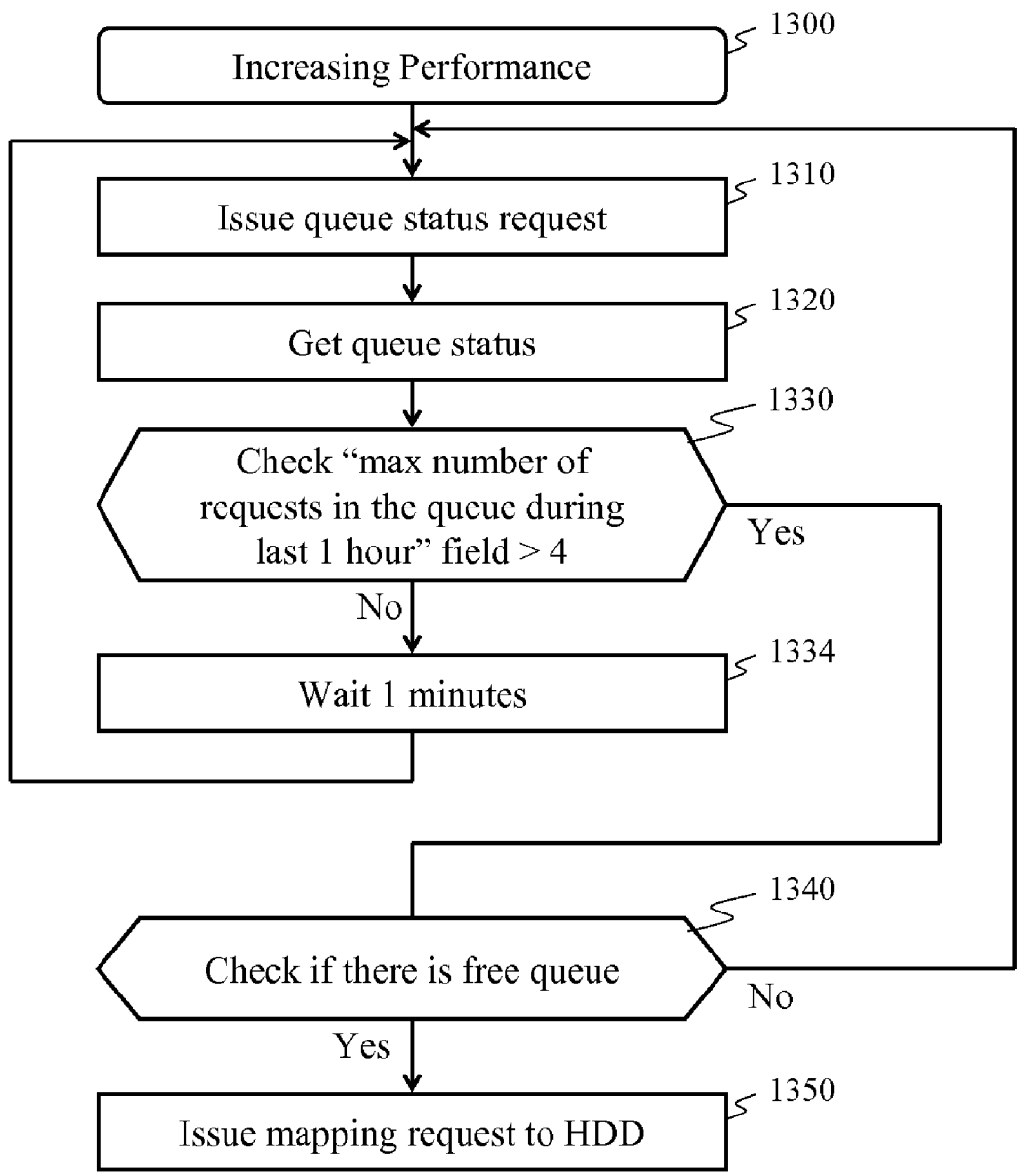
FIG. 13 shows a flow diagram for an exemplary method of monitoring and increasing performance.

FIG. 13 shows a flow diagram for an exemplary method of monitoring and increasing performance.

The performance monitoring program 523 on the management computer 500 can monitor the queue status by issuing frequent report queue status requests to the HDD 200. FIG. 13 shows an exemplary method for monitoring and increasing performance by adding queues to the data area.

At 1310, the data volume provisioning request program 521 in the management computer 500 issues a report queue status request to the HDDs.

At 1320, the queue status shown in FIG. 8 is reported by the performance partitioning management program 229.

At 1330, the management computer 500 checks if the "max number of requests in the queue during the last 1 hour" field is greater than 4. In the case of "Yes", the method proceeds to step 1340. In the case of "No", the process proceeds to step 1334.

At 1334, the management computer waits for a duration of time, for example for 1 minute, and returns to step 1310.

At 1340, the management computer 500 checks if there are free queues in the HDD. In the case of "No", the process proceeds to step 1310. In the case of "Yes", the process proceeds to 1350.

At 1350, the management computer 500 issues mapping requests. For example, five mapping requests shown in FIG. 8(c) are created and issued to five HDDs 200a, 200b, 200c, 200d, 200e. The queues 310a, 310b and 310d are assigned to the data area 351 in the five HDDs. 1200 iops at 4 KB data access=80 iops×5 HDD×3 queues can be predicted. The management computer 500 may display this performance result to administrators.

As mentioned above, data volume performance can be changed by modifying the number of queues assigned to the data area. Data volume performance can also be decreased by decreasing the number of queues assigned to the data area.

Figure 14:
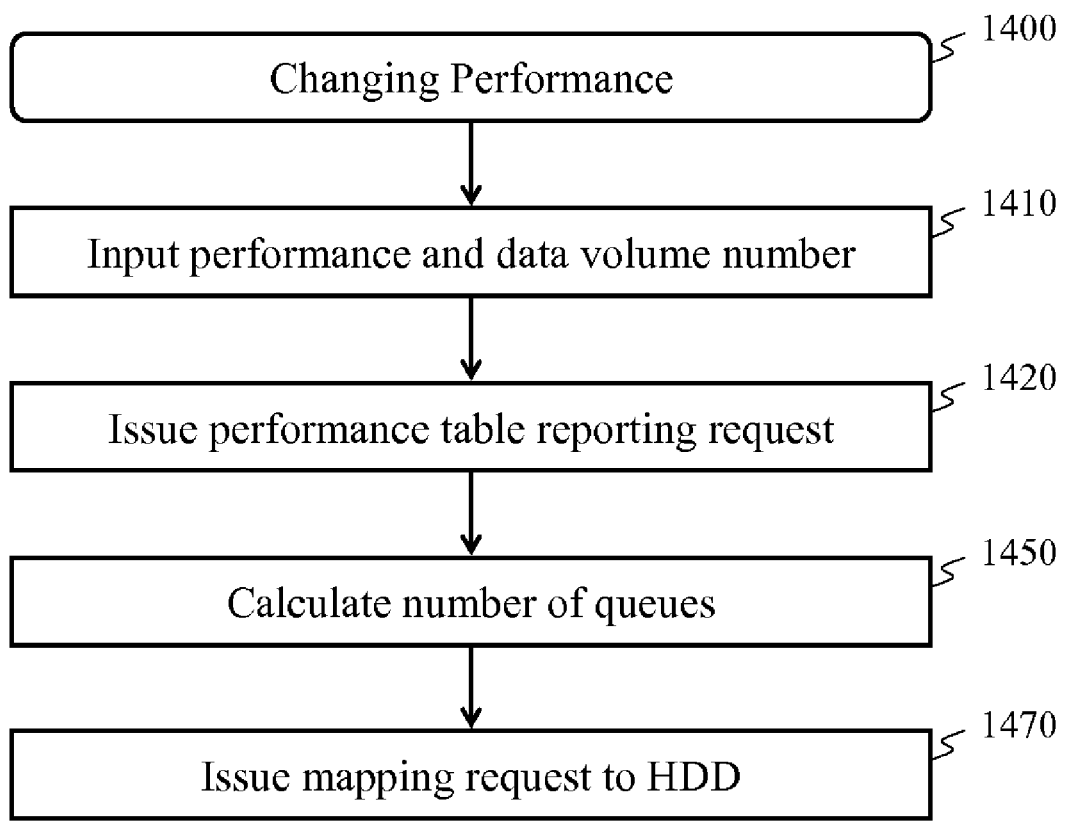
FIG. 14 shows another process flow for changing performance.

Another process flow for changing performance is shown in FIG. 14. The performance objective is given by an administrator via the management computer 500.

At 1410, an administrator inputs performance and target volume number. In the embodiment shown, 300 iops at 4 KB data access to the volume 111 is inputted.

At 1420, the data volume provisioning request program 521 issues a performance table reporting request to HDDs.

At 1450, the data volume provisioning request program 521 calculates number of queues for realizing the administrator's performance request. In the embodiment shown, the administrator's request is 300 iops at 4 KB data access and the new data volume 111 includes five HDDs. Each HDD has four queues. To achieve 300 iops at 4 KB data access, one queue at each HDD is required such that 80 iops×5 HDD×1 queues=400 iops>300 iops.

At 1470, the data volume provisioning request program 521 issues mapping requests. In the embodiment shown five mapping requests shown in FIG. 7(d) are created and issued to the five HDDs. The queue 310a is assigned to the data area 351 in the HDDs 200a, 200b, 200c, 200d, 200e. Other queues are freed. The queue management table 223 is updated according to the data area creation request.

The response program 160 in the storage apparatus 100 writes data from the host computer in a stripping manner. So the HDDs are used in a stripping manner.

Figure 15:
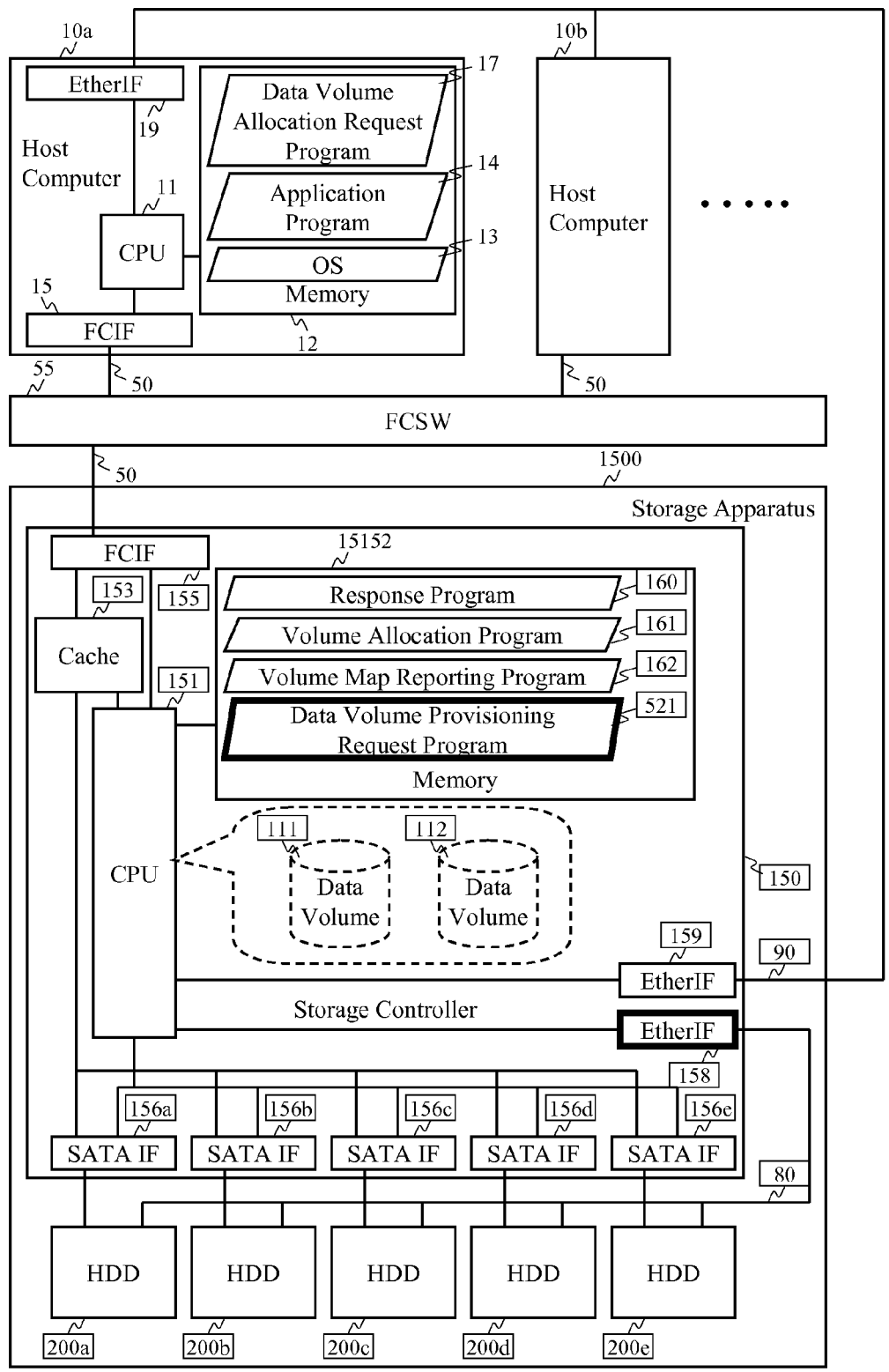
FIG. 15 shows another configuration that may be used to implement the embodiments of this invention and where the storage apparatus has management computer's capabilities.

FIG. 15 shows another configuration that may be used to implement the embodiments of this invention and where the storage apparatus has management computer's capabilities. In FIG. 15 unlike FIG. 1, a storage apparatus 1500 includes the data volume provisioning request program 521 in a memory 15152 and EhterIF 158 for connecting to the HDD management network 80. HDD 200 may be shipped with a number of queues. The number of queues is initialized to a default number; such as ten.

Figure 16:
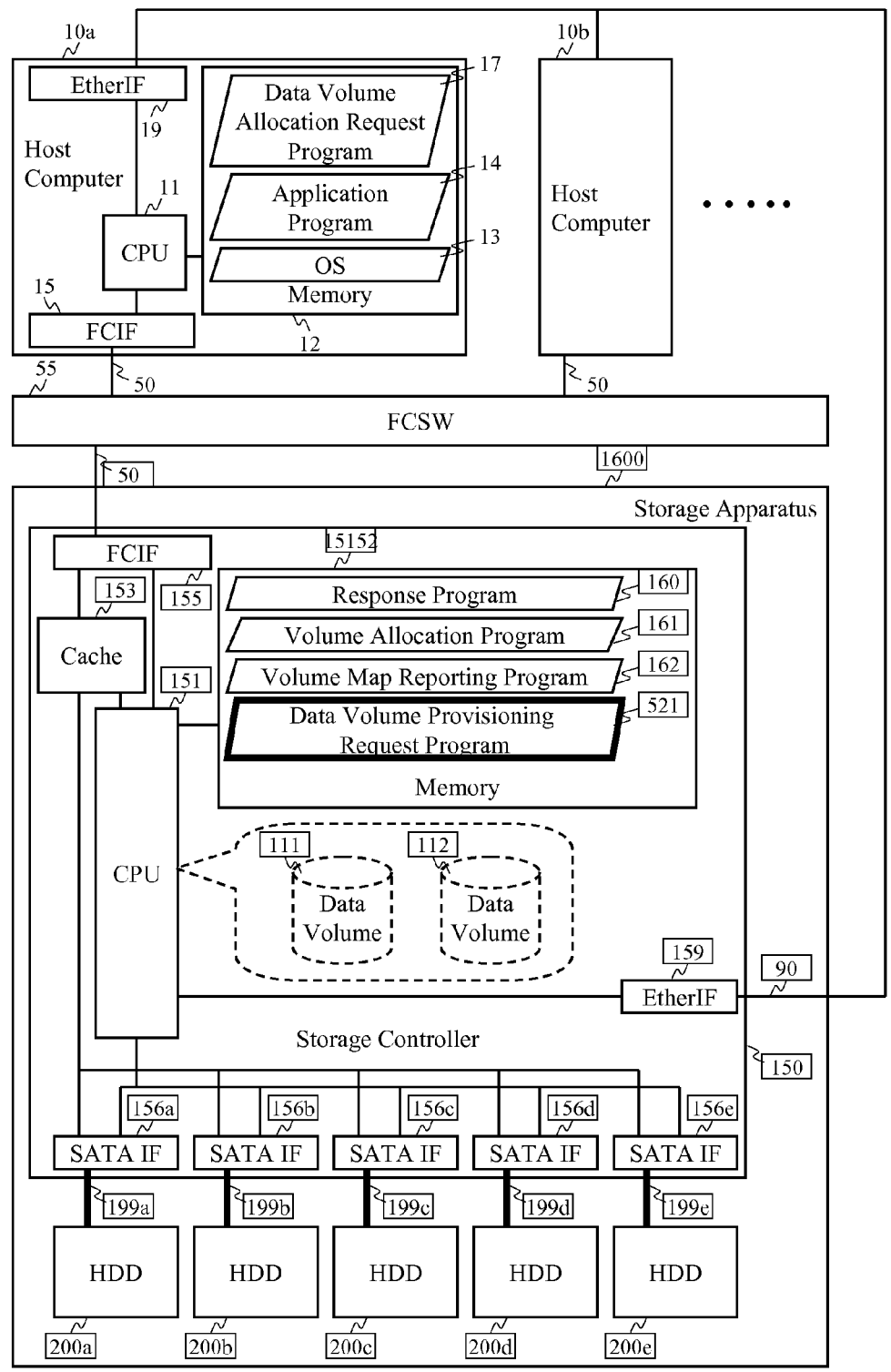
FIG. 16 shows another configuration that may be used to implement the embodiments of this invention and where the HDD is controlled through SATA IF.

FIG. 16 shows another configuration that may be used to implement the embodiments of this invention and where the HDD is controlled through SATA IF. In FIG. 16, unlike FIG. 15, the HDD management network of a storage apparatus 1600 is consolidated with the SATA IF connection 199. The data volume provisioning request program 521 in the memory 15152 communicates with the HDDs via the SATA IF 156 and the SATA connection 199 instead of EtherIF 158 and HDD management network 80. The HDD receives requests for the performance partitioning management program 229 via the SATA IF 290.

Figure 17:
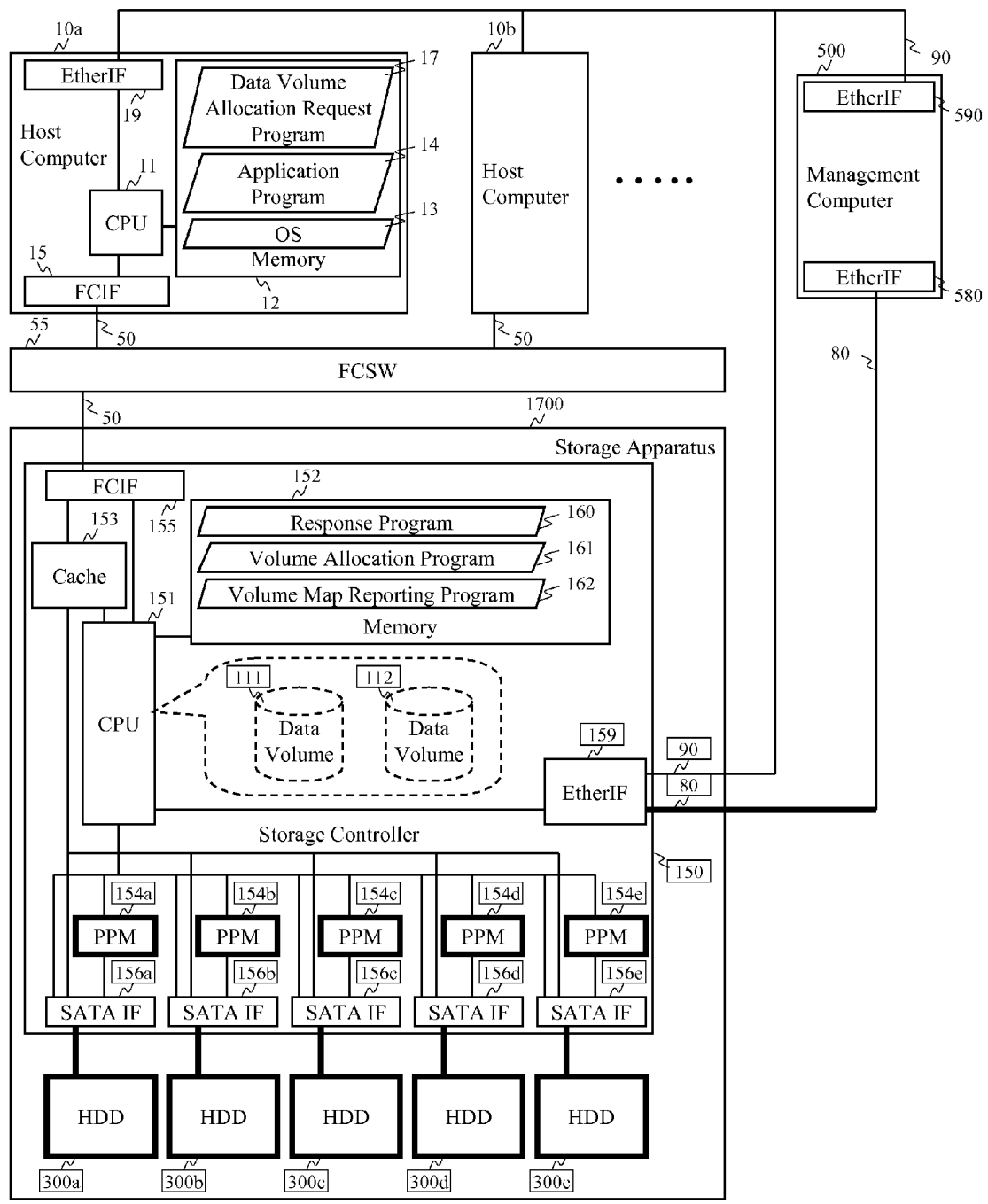
FIG. 17 shows another configuration applicable for implementing embodiments of this invention where the storage apparatus includes the performance partitioning module.

FIG. 17 shows another configuration applicable for implementing embodiments of this invention where the storage apparatus includes the performance partitioning module. Compared with FIG. 1, instead of having the performance partitioning program 222 in the HDD 200, a storage apparatus 1700 includes a performance partitioning module (PPM) 154. Logical configuration of the PPM 154 is similar to the configuration shown in FIG. 2 for the performance partitioning module 222. In this case, a standard HDD 300 with no performance partitioning functionality can be used. The data volume provisioning request program 521 on the management computer 500 issues requests to PPM 154 via the EtherIF 159.

Figure 18:
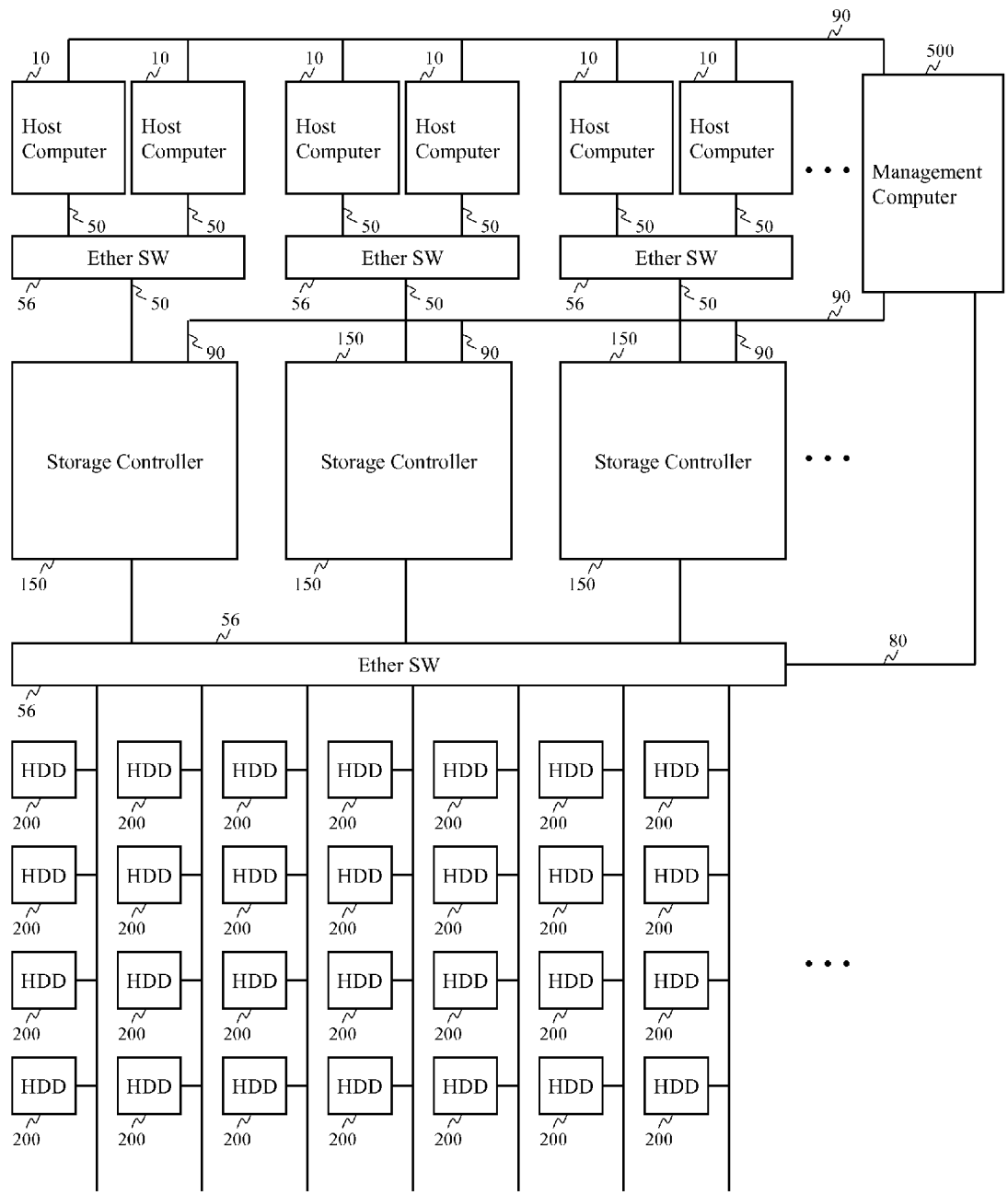
FIG. 18 shows another configuration used to implement the aspects of this invention including an iSCSI HDD configuration.

FIG. 18 shows another configuration used to implement the aspects of this invention including an iSCSI HDD configuration. Compared with FIG. 1, the host computers are connected to the storage controller via Ethernet switches (EtherSW) 56. Also the HDDs 200 are connected to the storage controller via Ethernet switch 56. Ethernet switches 56 are used for connecting the HDDs 200 to each other as well. To connect to the Ethernet, the host computers 10, the storage controllers 150 and the HDDs 200 all include Ethernet interfaces. The management computer 500 can control the performance partitioning functionality in the HDD 200 via the Ethernet HDD management network 80 and the EtherSW 56.

Figure 19:
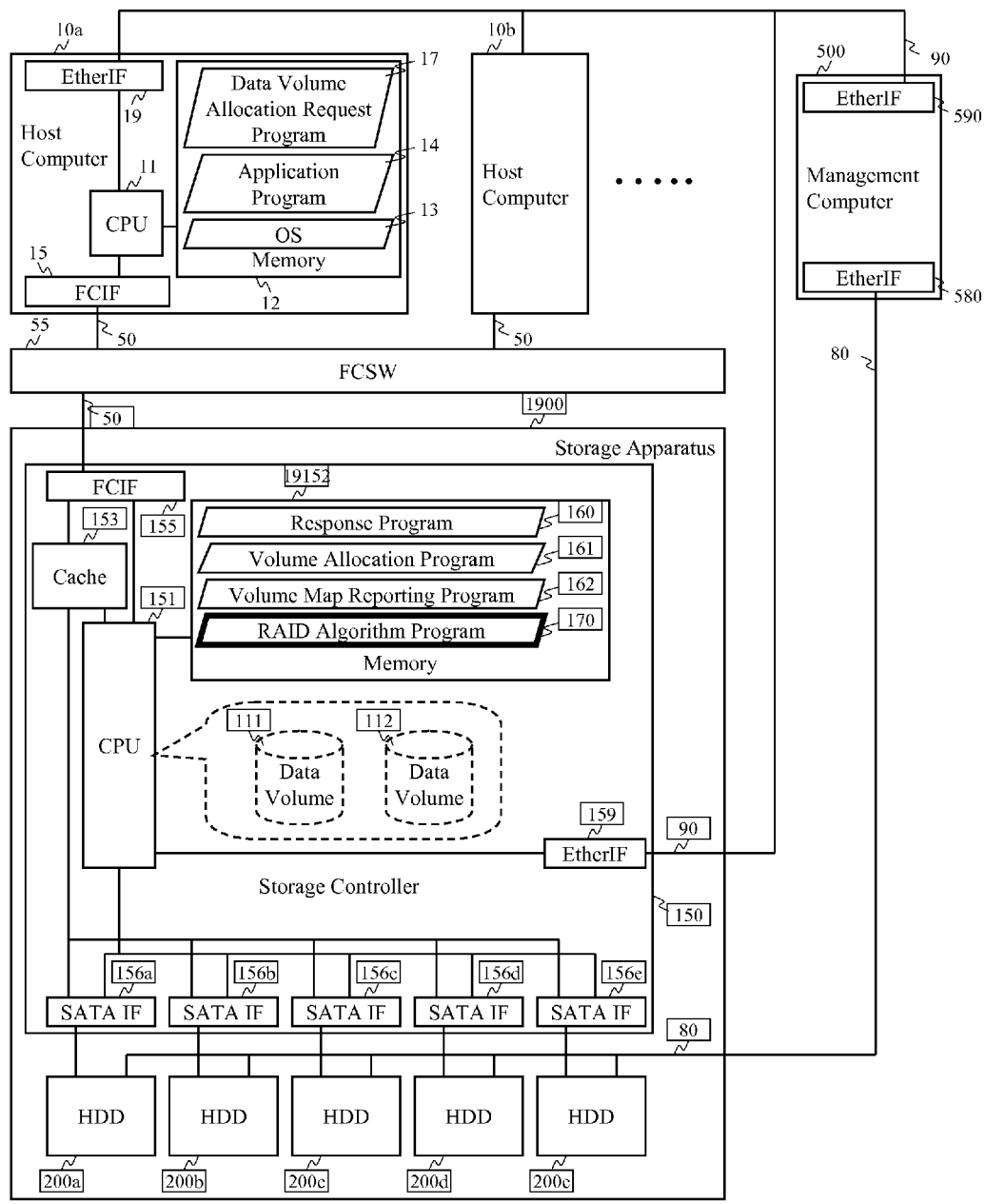
FIG. 19 shows another configuration that may be used to implement the aspects of this invention and includes a RAID algorithm program 170 in the storage controller of a storage apparatus 1900.

FIG. 19 shows another configuration that may be used to implement the aspects of this invention and includes a RAID algorithm program 170 in the storage controller of a storage apparatus 1900. The data volume can be controlled by the RAID algorithm program 170 in a memory 19152.

Figure 20:
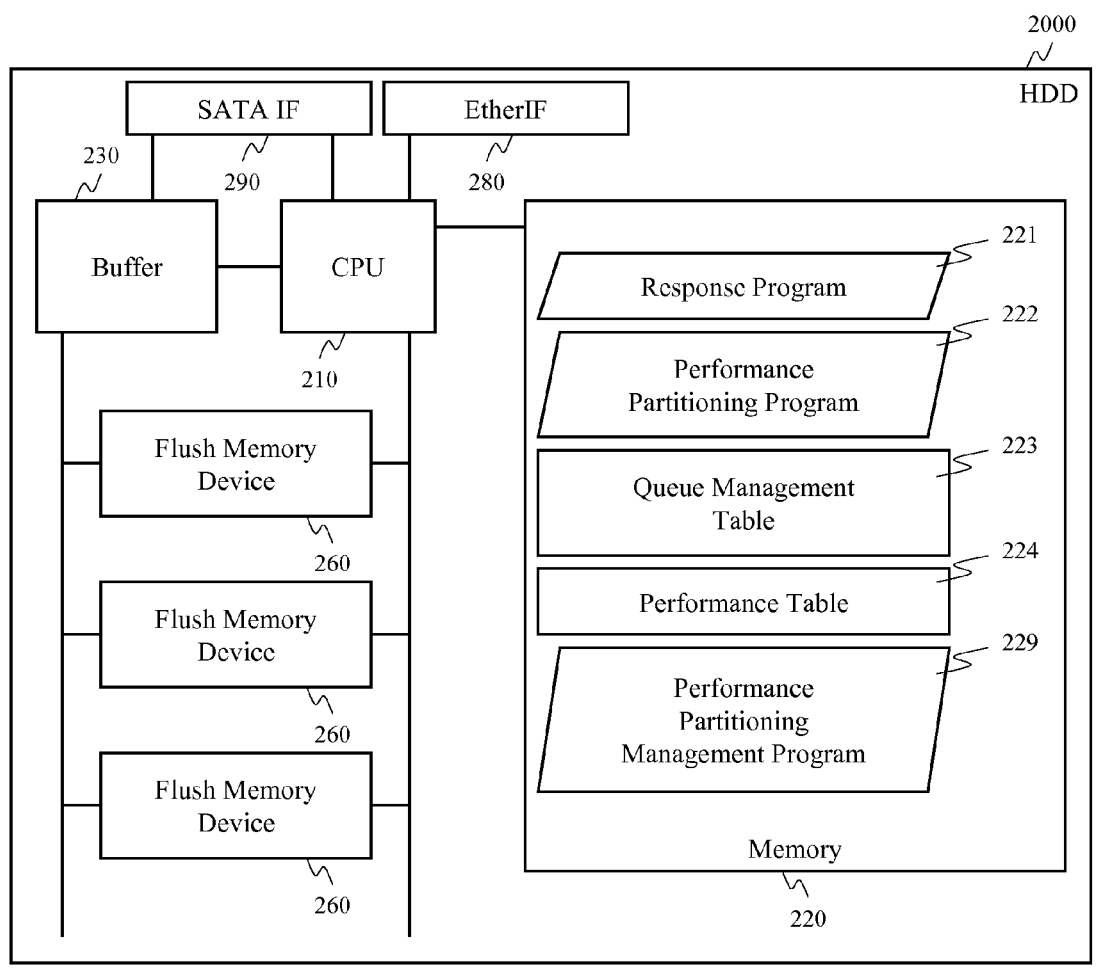
FIG. 20 shows a HDD 2000 including a flash memory configuration according to another aspect of the invention.

FIG. 20 shows a HDD 2000 including a flash memory configuration according to another aspect of the invention. Instead of the rotating recording medium 255 of FIG. 1(c), a flash memory device 260 is used in the HDD 2000.

Figure 21A:
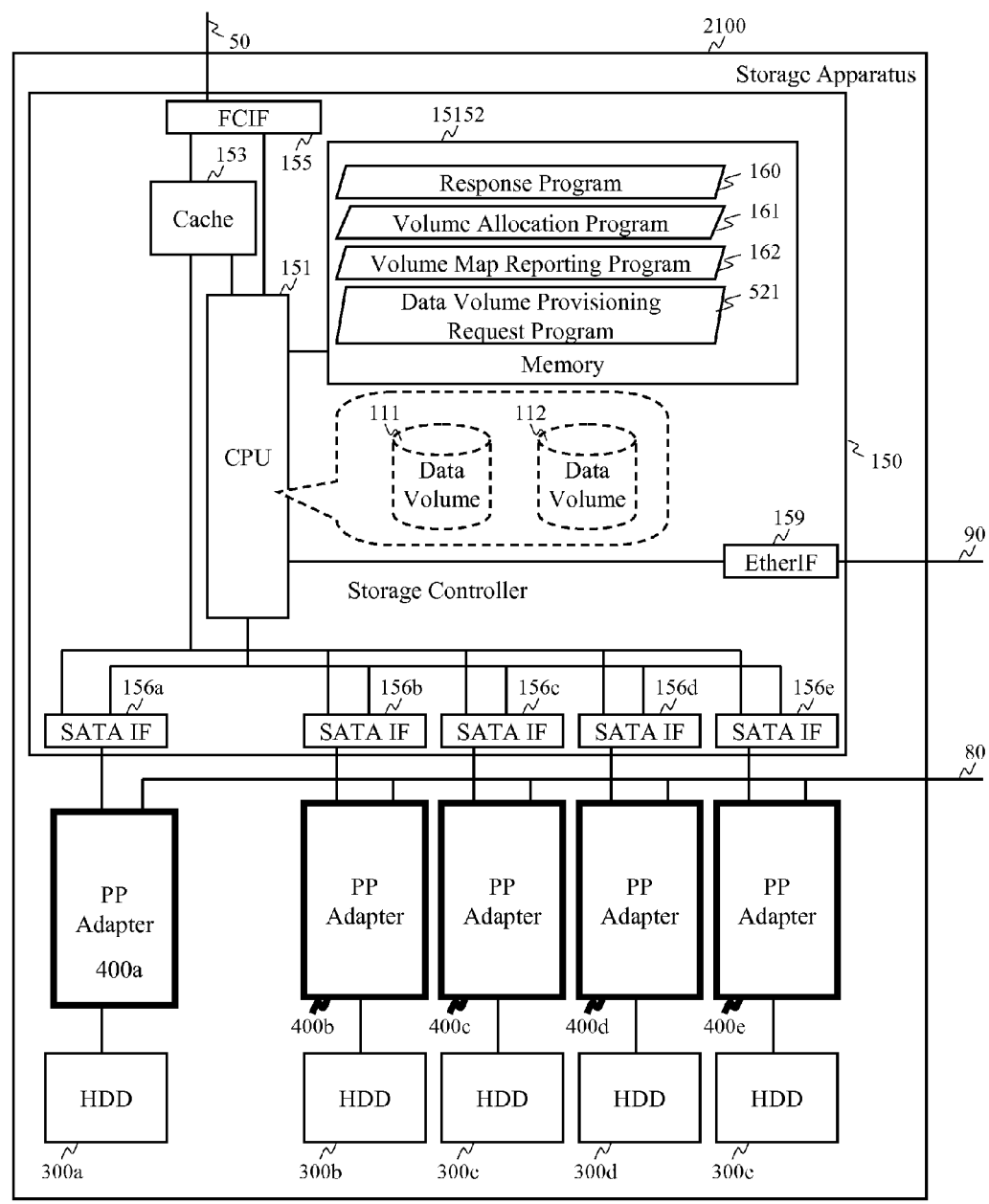
FIG. 21(a) shows a storage computer 2100 according to another configuration that may be used to implement the aspects of the present invention.
Figure 21B:
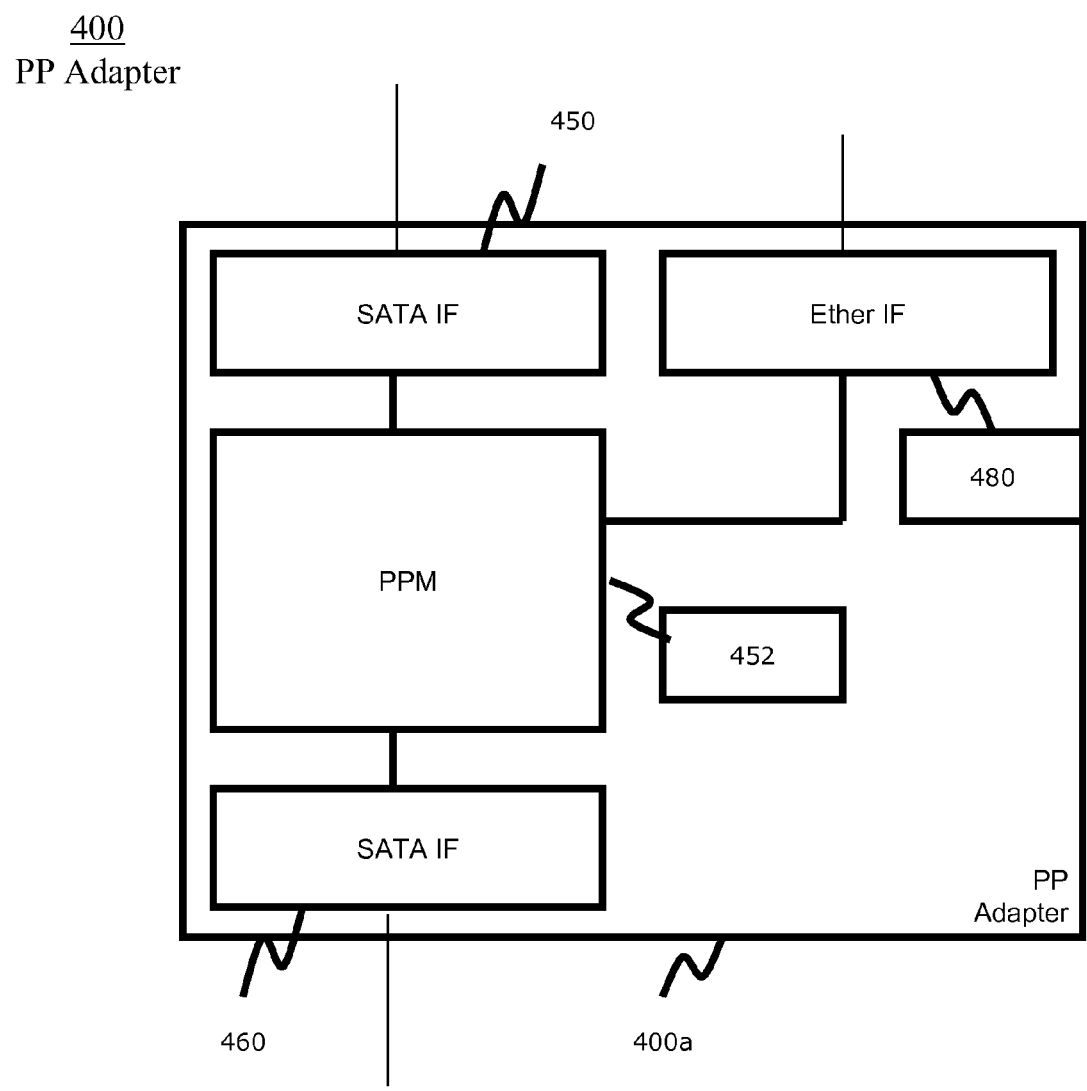
FIG. 21(b) shows the internal structure of a performance partitioning adapter according to aspects of the invention.

FIG. 21(a) shows a storage computer 2100 according to another configuration that may be used to implement the aspects of the present invention. Compared with FIG. 1, a number of performance partitioning adapters (PP Adapter) 400 are used for providing performance partitioning functionality. Each HDD is coupled to a performance partitioning adapter. The internal structure of a performance partitioning adapter 400 is shown in FIG. 21(b) and includes a SATA IF 450 for connecting to the SATA connection of the storage controller, a performance partitioning (PPM) module 452 for controlling performance partitioning, an EtherIF 480 for connecting the partitioning adapter 400 to the HDD management network 80, and another SATA IF 460 for connecting to the corresponding HDD 300. In the embodiment shown, the SATA IF 450 is connected to the storage controller 150. The performance partitioning module 452 may be managed via the EtherIF 480 or the SATA IF 450.

FIGS. 22 to 33 relate to another exemplary information system according to the aspects of the invention.

Figure 22:
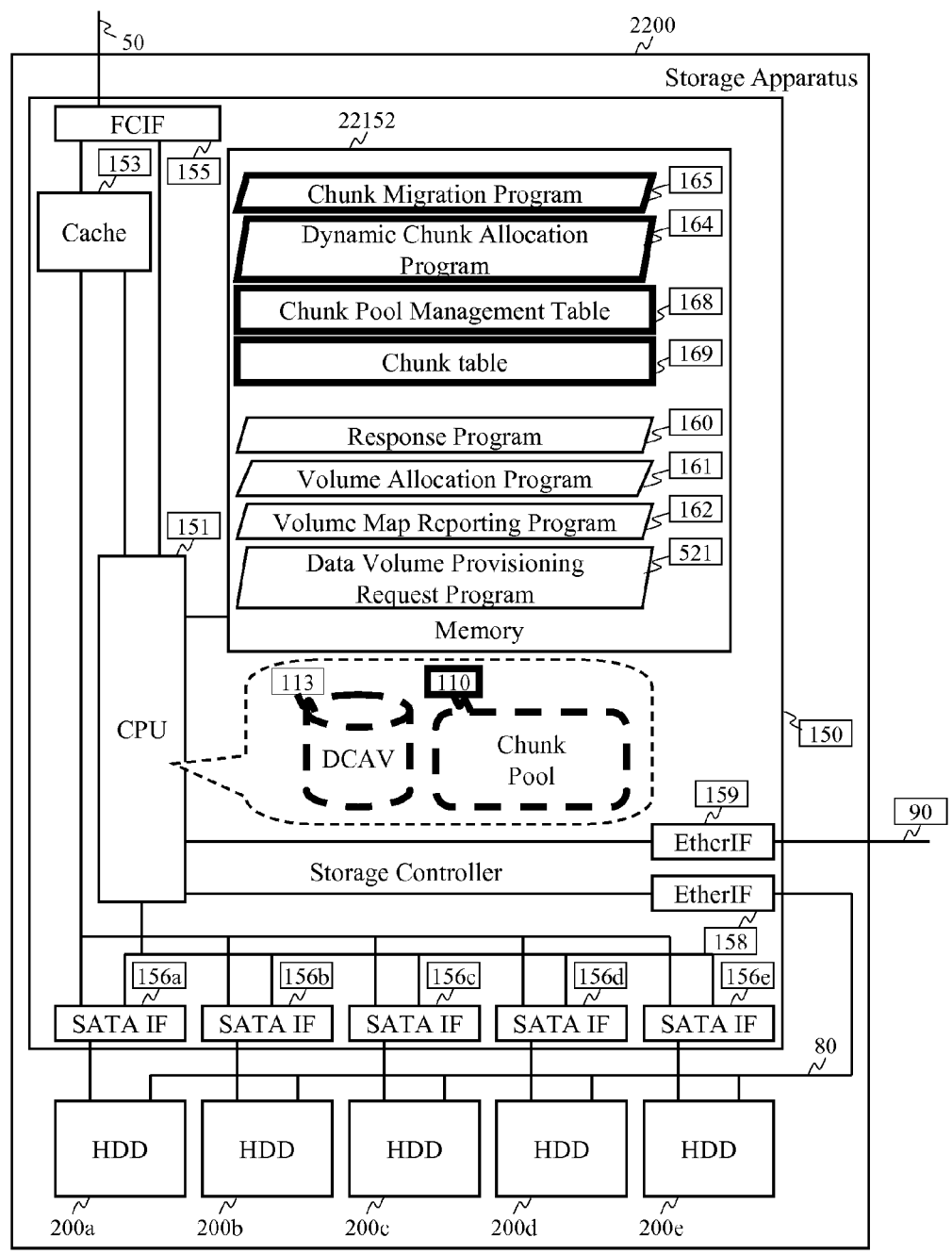

FIG. 22 shows an exemplary information system for implementing the aspects of the present invention. In the embodiment shown, a storage apparatus 2200 has dynamic chunk allocation functionality so that the storage apparatus 2200 creates dynamic chunk allocation volumes (DCAV). When utilizing a DCAV no data block is allocated initially. The storage controller of the storage apparatus 2200 includes chunk pool 110 and a DCAV 113 that are further explained below. A memory 22152 of the storage apparatus 2200, includes a dynamic chunk allocation program 164, a chunk migration program 165, a chunk pool management table 168, and a chunk table 169 in addition to the programs that are included on the memory 15152 of the storage apparatus 1500 shown in FIG. 15.

Figure 23:
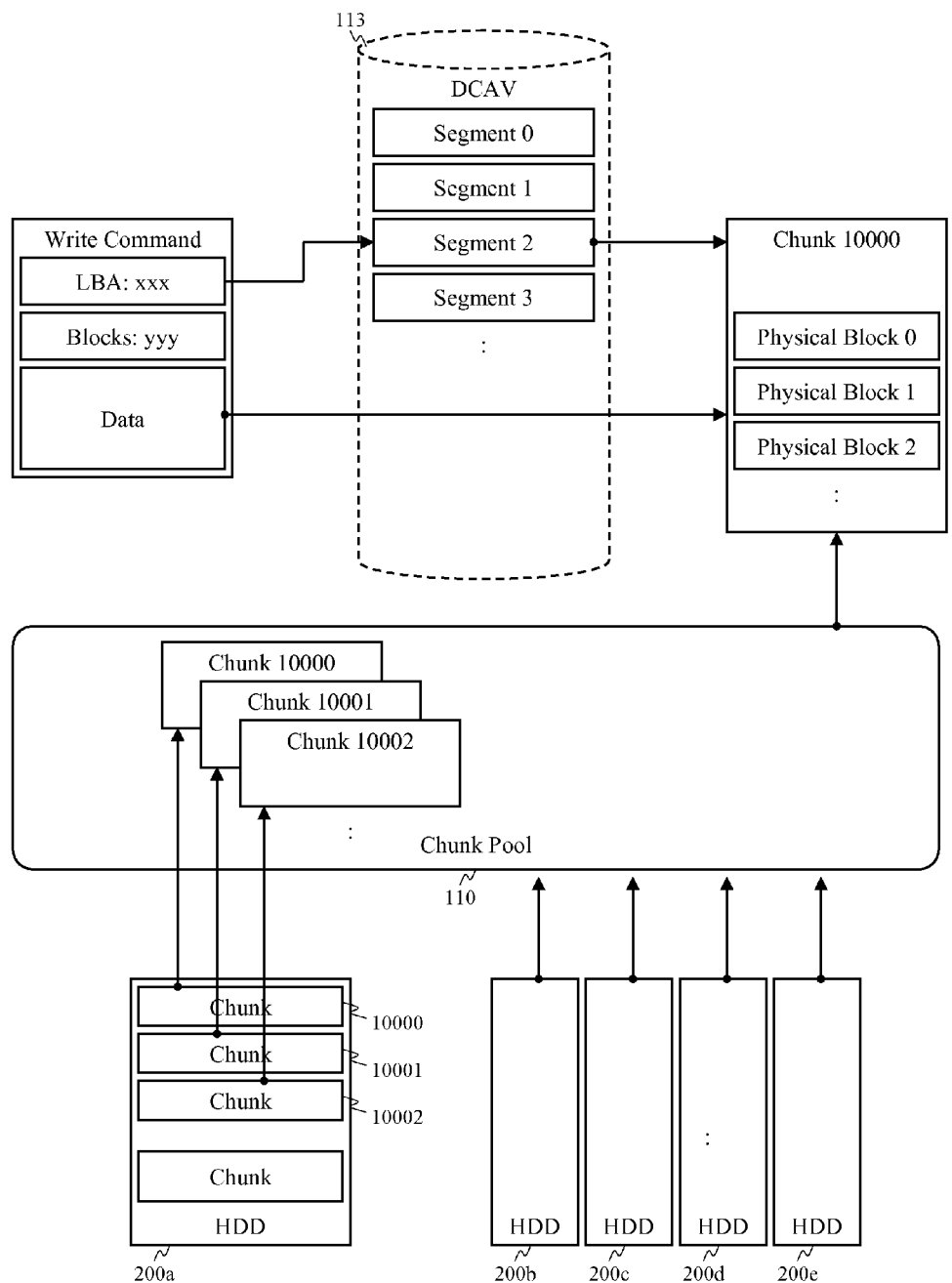

FIG. 23 shows a relationship between a WRITE command, the dynamic chunk allocation DCAV 113, the chunk pool 110, and chunks of the HDDs 200 according to aspects of the invention. The DCAV 113 may have an exemplary storage capacity of 10000 GB. However, no data blocks are allocated when the DCAV 113 is created. Only the overall size of the DCAV is assigned. The data blocks are allocated to the DCAV 113 when the DCAV 113 receives a WRITE command with data from the host computer. Each chunk 10000, 10001, 10002 is a collection of physical data blocks at the HDD. The DCAV 113 is divided into a number of segments as shown in FIG. 23. Sizes of the chunks and sizes of the segments are the same in the embodiment shown.

FIG. 24 shows a chunk pool management table 168 according to aspects of the invention. The chunk pool management table 168 includes columns showing a Chunk Number 16801, HDD Number 16802, LBA Range 16803, Allocation Status 16804, and Volume Number 16805. The Chunk Number 16801 is for storing a chunk number for identifying a chunk. The HDD Number 16802 is for storing the HDD numbers for the HDDs which are in the parity group. The LBA Range 16803 is for storing a LBA range corresponding to a chunk. The Allocation Status 16804 is for storing a status whether the chunk has been allocated to a volume or not. The Volume Number 16805 column is for storing a volume number corresponding to a volume at which the chunk has been allocated to the segment. No chunk is allocated to the DCAV initially. So all entries in the Allocation Status column 16804 and the Volume Number column 16805 start out as NULL.

FIG. 25 shows the chunk table 169 for the DCAV. The chunk table 169 includes a Volume Number column 16901 for storing a volume number, a Capacity column 16902 for storing capacity of the data volume, a Segment Number column 16903 for storing a segment number for identifying the segment, an Allocation Status column 16904 for storing a status of whether a chunk has been allocated or not, and a Chunk Number column 16905 for storing a chunk number, to which the chunk has been allocated. Initially, no chunk is allocated to the DCAV. So, initially all cells in the column 16904 and the column 16905 are empty.

FIG. 26 shows a queue management table 2600. The queue management table 2600 holds the HDD number, the number of queues, the queue numbers, the number of current requests, request numbers for each queue, the Tr, the Tadje, a data volume number, a maximum number of requests in each queue during the last one hour for performance report, and a queue busy ratio for performance report for each queue FIGS. 27(a) and 27(b) show a data volume and queue mapping table. In the embodiment shown in FIG. 22, the storage apparatus 2200 manages relations between a data volume and queues in the HDDs. The data volume and queue mapping tables shown in FIGS. 27(a) and 27(b) are held in the storage apparatus 2200. Each table includes a column for the data volume number, a column for one or more corresponding HDDs and a third column for the queue numbers of the queues in each of the HDDs.

Figure 28:
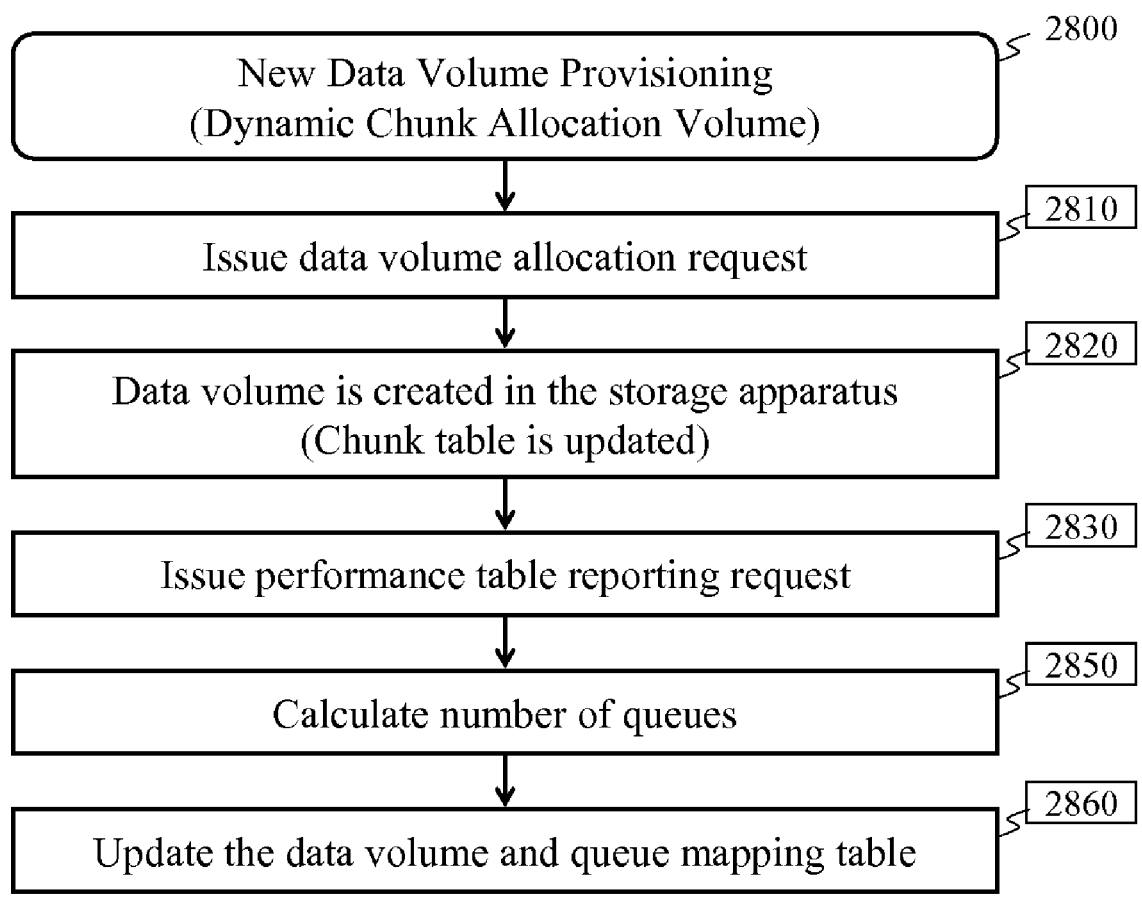

FIG. 28 shows a flow diagram for an exemplary method of creation of the DCAV 113 of FIG. 23 according to aspects of the invention. The flow diagram is for new data volume provisioning by dynamic chunk allocation according to aspects of the invention. In the embodiment shown, the data volume is a DCAV.

At 2810, the management computer 500 issues a data volume allocation request to the storage apparatus 2200. An administrator can provide parameters for data volume or the data volume allocation request program 17 on the host computer 10. The volume allocation request program can issue a data volume allocation request to the management computer 500. In the embodiment shown 10000 GB of data volume is requested by an administrator through the management computer 500. Also an administrator requests 100 iops at 4 KB data access.

At 2820, the data volume allocation program 161 in the storage apparatus 2200 creates DCAV 113 of FIG. 22. In the embodiment shown, the chunk table 169 is created as shown in FIG. 25.

At 2830, the data volume provisioning request program 521 in the storage apparatus 2200 issues performance table reporting request to the HDDs. In the embodiment shown, the performance information table shown in FIG. 9, is reported by the performance partitioning management program 229 in the HDD 200.

At 2850, the data volume provisioning request program 521 calculates the number of queues required for realizing the administrator's request. For example, the administrator's request is 100 iops at 4 KB data access. To achieve 100 iops at 4 KB data access, two queues are required because 80 iops×2 queues=160 iops>100 iops.

At 2860, the data volume provisioning request program 521 updates the data volume and queue mapping table 167. In the embodiment shown, the data volume and queue mapping table 167 is updated shown in FIG. 27(a). FIG. 27(b) shows a possible alternative.

In the process for dynamic chunk allocation, the capacity is determined and then a WRITE process is carried out. The host computer 10 can get capacity information from the storage apparatus 2200. The response program 160 provides a capacity information according to the chunk table 169 to the host computer 10 as a result of READ CAPACITY command even if the volume has no chunk. So the host computer recognizes a data volume of a certain size is available in the storage apparatus 2200.

Figure 29:
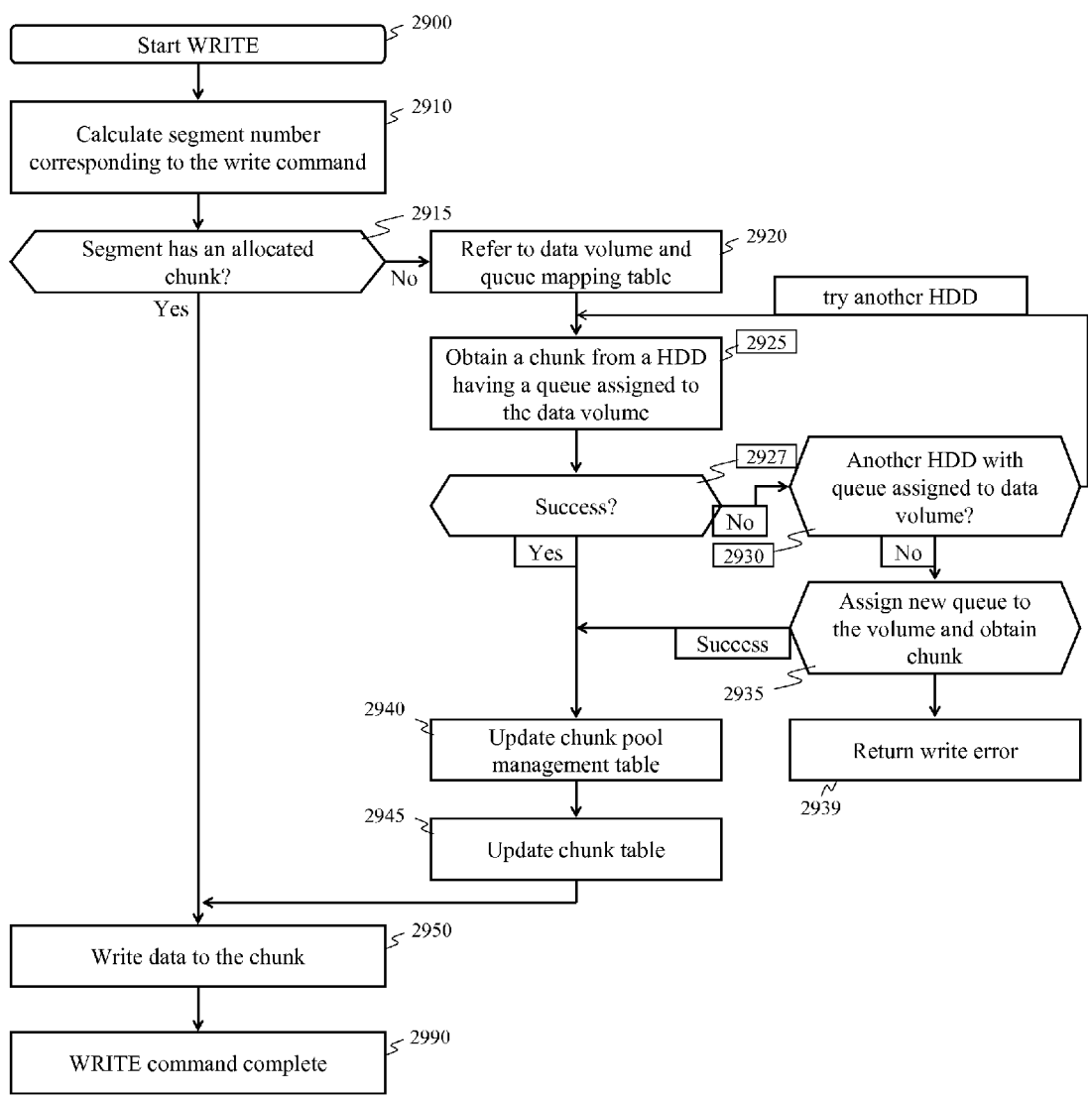

FIG. 29 shows a flow diagram for carrying out the WRITE process in the response program 160 and the dynamic chunk allocation program 165.

At 2910, the response program 160 calculates the segment number in the DCAV corresponding to the WRITE command. If the volume includes several segments, the segment number for each segment is determined and the following steps are carried out for all the segments in the volume.

At 2915, the response program 160 checks if the segment has a chunk already. If the segment does not have a chunk allocated to the segment, at 2920, the dynamic chunk allocation program 164 refers to the data volume and queue mapping table 167. The dynamic chunk allocation program 164 enumerates the queues associated with the DCAV.

At 2925, the dynamic chunk allocation program 164 tries to obtain a chunk from the HDD which has been assigned to the enumerated queues.

If the chunk allocation fails, at 2930, the dynamic chunk allocation program 165 tries to obtain a chunk form another HDD.

At 2935, In the case of chunk allocation fail, the dynamic chunk allocation program 165 tries to create a new queue on anther HDD that has free capacity and obtains a chunk from this other HDD.

At 2939, in the case of queue allocation fail, the response program 160 returns a WRITE error.

At 2927, in the case of chunk allocation success, the process proceeds to step 2940.

At 2940, the dynamic chunk allocation program 164 updates the chunk pool management table shown in FIG. 24. At 2945, the dynamic chunk allocation program 165 updates the chunk table of FIG. 25. If the segment has a chunk, the process proceeds to step 2950. At 2950, the response program 160 writes data to the chunk allocated to the segment via assigned queue. If there are a number of queues in the HDD, one of the queues is used for the WRITE. A queue without another request or with fewest requests is selected and used. At 2990, the response program 160 responds command complete.

Figure 30:
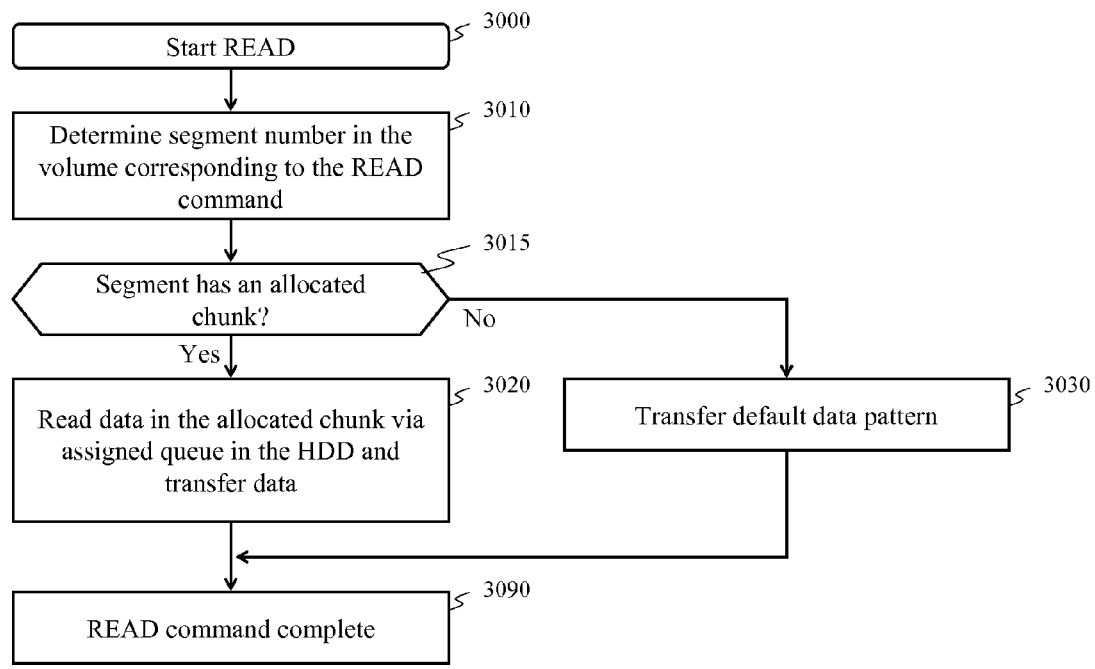

FIG. 30 shows a flow diagram for the READ process of the response program 160.

At 3010, the response program 160 calculates segment numbers in the DCAV corresponding to the READ command. At 3015, the response program 160 checks if the segments have a chunk already. If the segments have a chunk, the process proceeds to step 3020.

At 3020, the response program 160 reads data in the chunk allocated to each of the segments via the assigned queue in the HDD and transfers the data. If there are a number of queues in the HDD, one of the queues is used for the READ. A queue without another request or with fewest requests is selected and used. If a segment has no chunk allocated to it, the process proceeds to step 3030.

At 3030, the response program 160 transfers a default data pattern. Examples of default data pattern are all zero, all 0xFF, and the like. At 3090, the response program 160 responds command complete.

Figure 31:
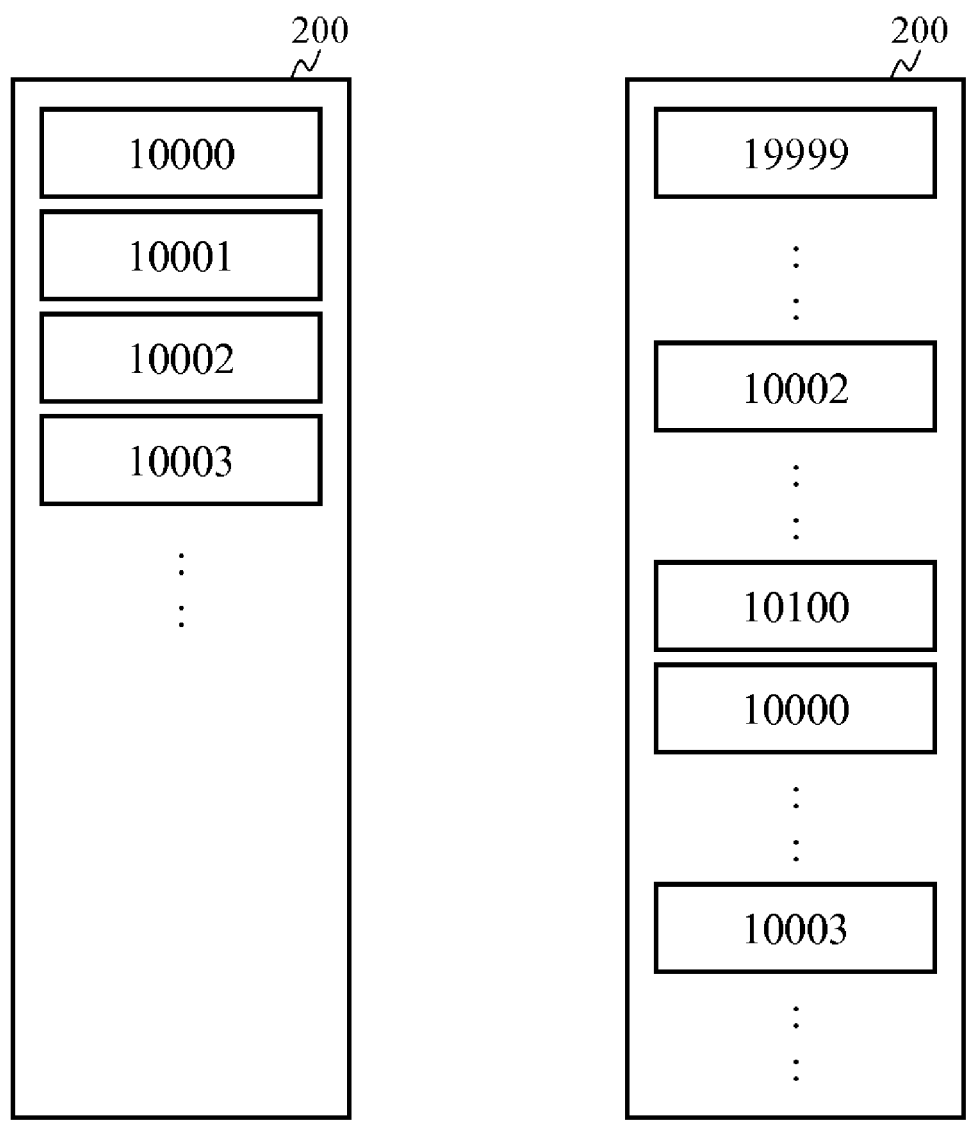

Chunk allocation may be performed as a sequential chunk allocation or as a random chunk allocation. A chunk may be allocated from top of the HDD block in sequential order or from a random location in the HDD. Random allocation helps equalizing the average seek time at each queue. The random order should be determined in the storage apparatus as pre-system configuration. FIG. 31 shows an example of the random chunk allocation.

Figure 32:
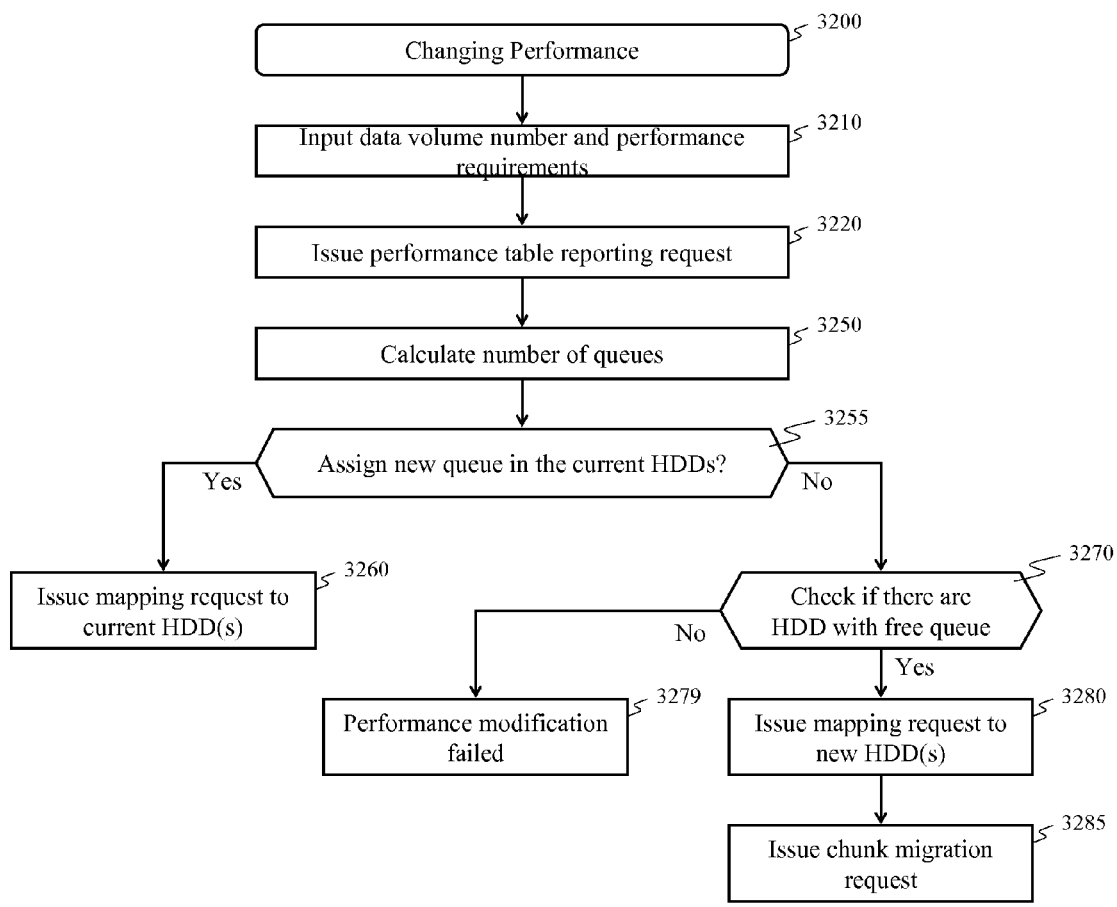

FIG. 32 shows a flow diagram for assigning a queue for performance improvement. As mentioned above, a new queue is assigned to the volume in the case of chunk allocation fail at step 2935 of FIG. 29. In another implementation, shown in FIG. 32, a queue is assigned for performance improvement according to an administrator's request from the management computer 500.

At 3210, an administrator inputs performance and target volume number.

At 3220, the data volume provisioning request program 521 issues a performance table reporting request to HDDs.

At 3250, the data volume provisioning request program 521 calculates the number of queues for realizing the administrator's performance request.

At 3255, the data volume provisioning request program 521 checks if the required queue or queues can be assigned in the current HDDs, which already include queues and chunks. In the case of queue assign success, the process proceeds to step 3260.

At 3260, the data volume provisioning request program 521 issues mapping requests to current HDD(s). In the case of queue assign fail, proceed to step 3270.

At 3270, the data volume provisioning request program 521 checks if there are HDD with free queues and free chunks. If no such HDDs are found, the process proceeds to step 3279.

At 3279, the data volume provisioning request program 521 returns performance modification failed.

At 3280, the data volume provisioning request program 521 issues mapping requests to the new HDD(s). At 3285, the data volume provisioning request program 521 issues a chunk migration request to the chunk migration program 165 in the memory 152 for equalizing performance.

Figure 33:
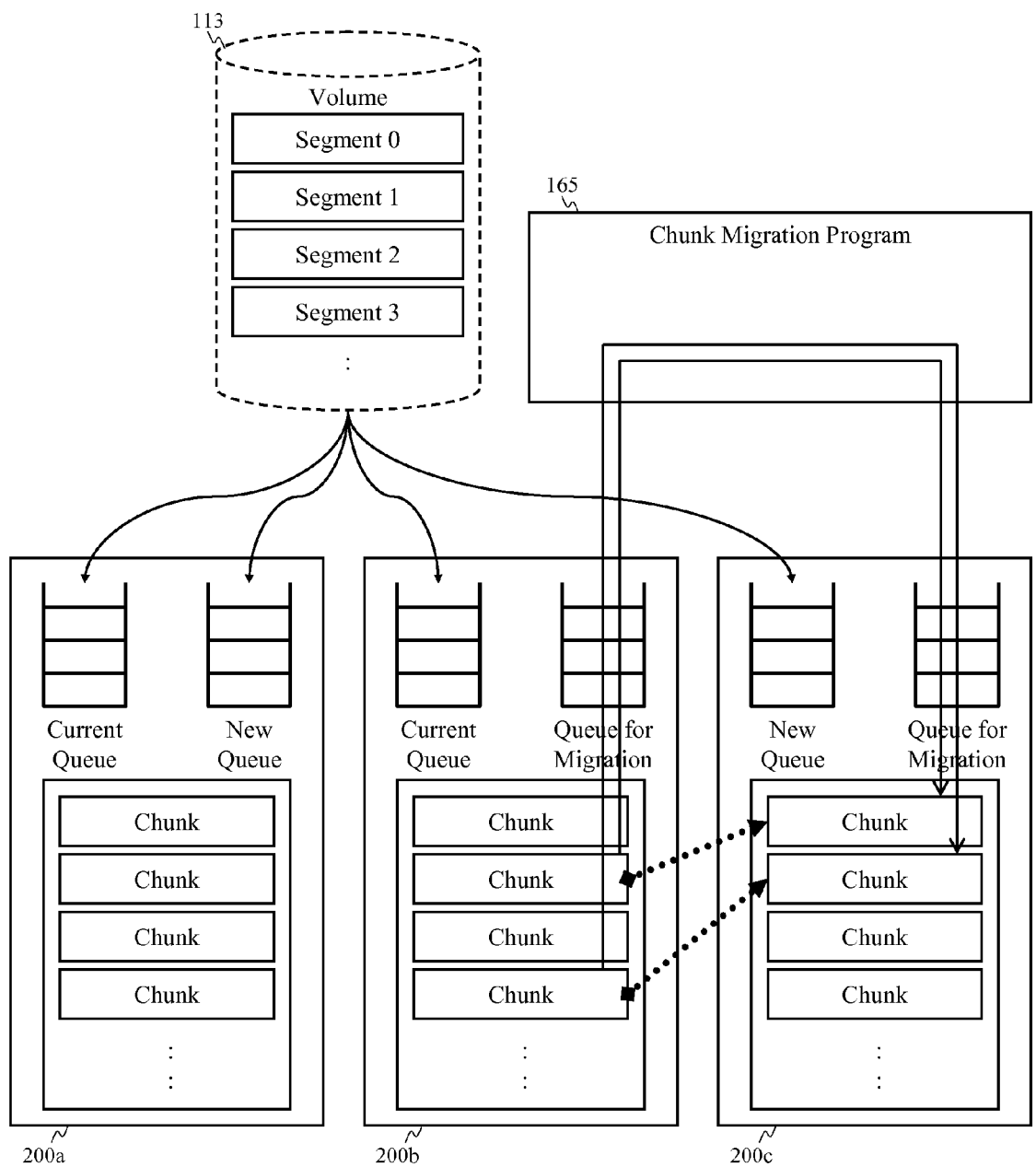

FIG. 33 shows an example of chunk migration among HDDs. Some chunks are moved to a new HDD and assigned a new queue. No chunk migration is executed in a HDD which includes both a current queue and a new queue. The chunk migration program 165 may assign independent queues for chunk migration. In this case, migration is executed within a separate data area by the performance partitioning capability in the HDD.

Figure 34:
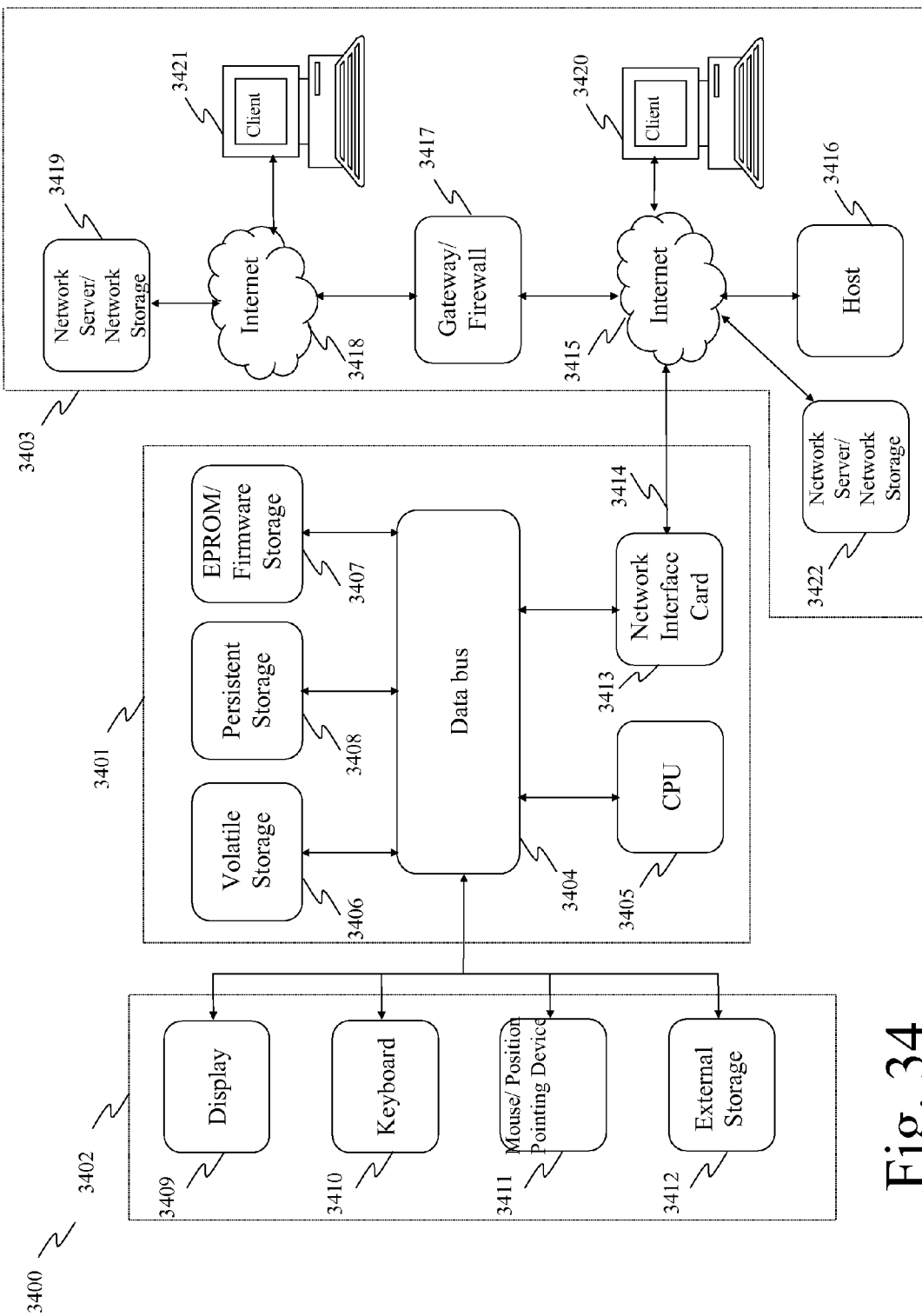
FIG. 34 illustrates an exemplary embodiment of a computer platform upon which the inventive system may be implemented.

FIG. 34 is a block diagram that illustrates an embodiment of a computer/server system 3400 upon which an embodiment of the inventive methodology may be implemented. The system 3400 includes a computer/server platform 3401, peripheral devices 3402 and network resources 3403.

The computer platform 3401 may include a data bus 3405 or other communication mechanism for communicating information across and among various parts of the computer platform 3401, and a processor 3405 coupled with bus 3401 for processing information and performing other computational and control tasks. Computer platform 3401 also includes a volatile storage 3406, such as a random access memory (RAM) or other dynamic storage device, coupled to bus 3405 for storing various information as well as instructions to be executed by processor 3405. The volatile storage 3406 also may be used for storing temporary variables or other intermediate information during execution of instructions by processor 3405. Computer platform 3401 may further include a read only memory (ROM or EPROM) 3407 or other static storage device coupled to bus 3405 for storing static information and instructions for processor 3405, such as basic input-output system (BIOS), as well as various system configuration parameters. A persistent storage device 3408, such as a magnetic disk, optical disk, or solid-state flash memory device is provided and coupled to bus 3401 for storing information and instructions.

Computer platform 3401 may be coupled via bus 3405 to a display 3409, such as a cathode ray tube (CRT), plasma display, or a liquid crystal display (LCD), for displaying information to a system administrator or user of the computer platform 3401. An input device 3410, including alphanumeric and other keys, is coupled to bus 3401 for communicating information and command selections to processor 3405. Another type of user input device is cursor control device 3411, such as a mouse, a trackball, or cursor direction keys for communicating direction information and command selections to processor 3405 and for controlling cursor movement on display 3409. This input device typically has two degrees of freedom in two axes, a first axis (e.g., x) and a second axis (e.g., y), that allows the device to specify positions in a plane.

An external storage device 3412 may be coupled to the computer platform 3401 via bus 3405 to provide an extra or removable storage capacity for the computer platform 3401. In an embodiment of the computer system 3400, the external removable storage device 3412 may be used to facilitate exchange of data with other computer systems.

The invention is related to the use of computer system 3400 for implementing the techniques described herein. In an embodiment, the inventive system may reside on a machine such as computer platform 3401. According to one embodiment of the invention, the techniques described herein are performed by computer system 3400 in response to processor 3405 executing one or more sequences of one or more instructions contained in the volatile memory 3406. Such instructions may be read into volatile memory 3406 from another computer-readable medium, such as persistent storage device 3408. Execution of the sequences of instructions contained in the volatile memory 3406 causes processor 3405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 3408. Volatile media includes dynamic memory, such as volatile storage 3406. Transmission media includes coaxial cables, copper wire and fiber optics, including the wires that comprise data bus 3405. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 3405 for execution. For example, the instructions may initially be carried on a magnetic disk from a remote computer. Alternatively, a remote computer can load the instructions into its dynamic memory and send the instructions over a telephone line using a modem. A modem local to computer system 3400 can receive the data on the telephone line and use an infra-red transmitter to convert the data to an infra-red signal. An infra-red detector can receive the data carried in the infra-red signal and appropriate circuitry can place the data on the data bus 3405. The bus 3405 carries the data to the volatile storage 3406, from which processor 3405 retrieves and executes the instructions. The instructions received by the volatile memory 3406 may optionally be stored on persistent storage device 3408 either before or after execution by processor 3405. The instructions may also be downloaded into the computer platform 3401 via Internet using a variety of network data communication protocols well known in the art.

The computer platform 3401 also includes a communication interface, such as network interface card 3413 coupled to the data bus 3405. Communication interface 3413 provides a two-way data communication coupling to a network link 3415 that is coupled to a local network 3415. For example, communication interface 3413 may be an integrated services digital network (ISDN) card or a modem to provide a data communication connection to a corresponding type of telephone line. As another example, communication interface 3413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 3413 sends and receives electrical, electromagnetic or optical signals that carry digital data streams representing various types of information.

Network link 3413 typically provides data communication through one or more networks to other network resources. For example, network link 3415 may provide a connection through local network 3415 to a host computer 3416, or a network storage/server 3417. Additionally or alternatively, the network link 3413 may connect through gateway/firewall 3417 to the wide-area or global network 3418, such as an Internet. Thus, the computer platform 3401 can access network resources located anywhere on the Internet 3418, such as a remote network storage/server 3419. On the other hand, the computer platform 3401 may also be accessed by clients located anywhere on the local area network 3415 and/or the Internet 3418. The network clients 3420 and 3421 may themselves be implemented based on the computer platform similar to the platform 3401.

Local network 3415 and the Internet 3418 both use electrical, electromagnetic or optical signals that carry digital data streams. The signals through the various networks and the signals on network link 3415 and through communication interface 3413, which carry the digital data to and from computer platform 3401, are exemplary forms of carrier waves transporting the information.

Computer platform 3401 can send messages and receive data, including program code, through the variety of network(s) including Internet 3418 and LAN 3415, network link 3415 and communication interface 3413. In the Internet example, when the system 3401 acts as a network server, it might transmit a requested code or data for an application program running on client(s) 3420 and/or 3421 through Internet 3418, gateway/firewall 3417, local area network 3415 and communication interface 3413. Similarly, it may receive code from other network resources.

The received code may be executed by processor 3405 as it is received, and/or stored in persistent or volatile storage devices 3408 and 3406, respectively, or other non-volatile storage for later execution. In this manner, computer system 3401 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with performance partitioning functionality. It is intended that the specification and examples be considered as exemplary only, with a true scope and spirit of the invention being indicated by the following claims.

What is claimed is:

1. A computerized data storage apparatus comprising:
    a plurality of storage devices;
    and a storage controller operable to provide a plurality of logical data volumes to at least one host computer for data access, wherein:
    said logical data volume is associated with a performance information,
    each of the plurality of storage devices includes a plurality of data areas and a queue associated
    to each of said plurality of data areas;
    each queue is associated to a logical data volume based on performance information,
    wherein a mapping information between said plurality of queues and said plurality of data areas is stored in said storage controller and updated dynamically according to said performance information,
        said logical data volume is allocated from multiple data areas of said plurality of data areas from said storage devices, wherein each data area of said data areas is allocated in response to a write request using said mapping information;
    wherein the storage devices of the storage apparatus store the data being provided to the host computer through the data volumes, and
    wherein the storage devices comprise a storage device memory for storing and executing:
        a response program for responding to a READ/WRITE command from the host computer;
        a performance partitioning program for adjusting request execution among data areas and
        a performance partitioning management program for configuring a performance partition management table and a performance partition status table:
    wherein the storage device memory stores:
    a performance partition management table including a logical block addressing range for each of the data areas and
    a performance table including performance information for the storage device;
    wherein a performance partition management table on each of the storage devices records a correspondence between each one of the data areas and one or more of the plurality of data areas,
    wherein a volume map table on the storage apparatus maps each of the data volumes to one or more of the storage devices, and
    wherein the data available from each of the data volumes is stored on the data areas on one or more of the hard disk drives;
    wherein the performance information comprises a data access length, a hard disk drive performance parameter and a partition performance parameter, and wherein the hard disk drive performance parameter and the partition performance parameter are determined based on a number of input/output operations per second.

2. The computerized data storage apparatus of claim 1, wherein the storage devices are hard disk drives;
    wherein said mapping information is updated in response to a mapping request to change performance of said computerized data storage apparatus,
    wherein no data areas are allocated to said logical data volume when said logical data volume is created.

3. The computerized data storage apparatus of claim 1, wherein the storage devices comprise at least one semiconductor memory unit.

4. The computerized data storage apparatus of claim 1, wherein the storage controller of the storage apparatus is operable to allocate a performance unit to each of the plurality of data areas of a specific storage device.

5. The computerized data storage apparatus of claim 1, wherein the performance information comprises a requested logical data volume performance specified by a user.

6. The computerized data storage apparatus of claim 1, wherein the host computer comprises a logical data volume allocation request program for sending requests for allocation of the logical data volumes on the storage apparatus, the logical data volumes storing data being utilized by at least one application program running on the host computer.

7. The computerized data storage apparatus of claim 1, wherein the storage apparatus further comprises:
    a response program for responding to a READ or WRITE command from the host computer;
    a volume allocation program for creating the data volumes and allocating the data volumes to a host computer; and
    a volume map reporting program for reporting volume mapping information to the management module,
    wherein a volume map table generated by the volume map reporting program establishes a correspondence between each data volume and the storage devices associated with the data volume.

8. The computerized data storage apparatus of claim 1,
    wherein each of storage devices includes a recording medium being divided into one or more data areas, and
    wherein for each of the storage devices, the performance partition management table provides the data area corresponding to each of the data areas on the storage device.

9. The computerized data storage apparatus of claim 1, wherein the management module resides on a management computer coupled to the host computer and the storage apparatus or on the storage apparatus.

10. The computerized data sotrage apparatus of claim 1, wherein the write request comprises a requisite data access length and a requisite number of input/output operations per second.

11. The computerized data storage apparatus of claim 4, wherein the performance unit is a time window ratio.

12. The computerized data storage apparatus of claim 8, wherein the management module stores:
    a data volume provisioning request program for sending a request to the storage apparatus,
    a storage device performance partitioning request program for requesting partitioning of the storage device among the data volumes, and
    a performance monitoring program for monitoring performance partition status and adjusting the partitioning.

13. A computerized data storage apparatus
comprising: a plurality of storage devices;
and a storage controller operable to create a logical data volume provided to a host computer for data access, wherein:
said logical data volume is associated with a performance information;
each of said plurality of storage devices includes a plurality of data areas and a plurality of queues associated to said plurality of data areas;
each of said plurality of storage devices comprises a partition information including an information on number of said data areas and an information on number of queues;
said storage controller associates at least some of said plurality of queues to the logical data volume according to the performance information and the partition information;
wherein a mapping information between said plurality of queues and said plurality of data areas is stored in said storage controller and updated dynamically according to said performance information,
wherein each data area of said data areas is allocated in response to a write request using said mapping information;
wherein the storage devices of the storage apparatus store the data being provided to the host computer through the data volumes, and
wherein the storage devices comprise a storage device memory for storing and executing:
    a response program for responding to a READ/WRITE command from the host computer;
    a performance partitioning program for adjusting request execution among data areas and
    a performance partitioning management program for configuring a performance partition management table and a performance partition status table;
wherein the storage device memory stores:
a performance partition management table including a logical block addressing range for each of the data areas and
a performance table including performance information for the storage device;
wherein a performance partition management table on each of the storage devices records a correspondence between each one of the data areas and one or more of the plurality of data areas,
wherein a volume map table on the storage apparatus maps each of the data volumes to one or more of the storage devices, and
wherein the data available from each of the data volumes is stored on the data areas on one or more of the hard disk drives;
wherein the performance information comprises a data access length, a hard disk drive performance parameter and a partition performance parameter, and wherein the hard disk drive performance parameter and the partition performance parameter are determined based on a number of input/output operations per second.

14. The computerized data storage apparatus of claim 13, wherein the storage devices are hard disk drives;
wherein said mapping information is updated in response to a mapping request to change performance of said computerized data storage apparatus,
wherein no data areas are allocated to said logical data volume when said logical data volume is created.

15. The computerized data storage apparatus of claim 13, wherein the storage controller of the storage apparatus is operable to allocate a performance unit to each of the plurality of data areas of a specific storage device.

16. The computerized data storage apparatus of claim 13, wherein the host computer comprises a logical data volume allocation request program for sending requests for allocation of the logical data volumes on the storage apparatus, the logical data volumes storing data being utilized by at least one application program running on the host computer.

17. The computerized data storage apparatus of claim 13, wherein the storage apparatus further comprises:
    a response program for responding to a READ or WRITE command from the host computer;
    a volume allocation program for creating the data volumes and allocating the data volumes to a host computer;
    and a volume map reporting program for reporting volume mapping information to the management module,
    wherein a volume map table generated by the volume map reporting program establishes a correspondence between each data volume and the storage devices associated with the data volume.

18. The computerized data sotrage apparatus of claim 13, wherein the write request comprises a requisite data access length and a requisite number of input/output operations per second.

* * * * *

UNITED STATES PATENT AND TRADEMARK OFFICE
CERTIFICATE OF CORRECTION

PATENT NO. : 7,979,604 B2
APPLICATION NO. : 11/970225
DATED : July 12, 2011
INVENTOR(S) : Yasunori Kaneda Page 1 of 1

It is certified that error appears in the above-identified patent and that said Letters Patent is hereby corrected as shown below:

- Column 9, line 17-18: Delete "Tadj=Tadj+(T0-Tr)/N-l)" and insert -- Tadj=Tadj+(T0-Tr)/(N-1)--,

- Column 13, line 62: Delete "EhterIF" and insert -- EtherIF --,

- Column 21, line 47: In Claim 1, delete "table:" and insert -- table; --,

- Column 22, line 53 (Approx.): In Claim 10, delete "sotrage" and insert -- storage --,

- Column 24, line 42: In Claim 18, delete "sotrage" and insert -- storage --,

Signed and Sealed this
Twentieth Day of December, 2011

David J. Kappos
*Director of the United States Patent and Trademark Office*